(12) United States Patent
Ikeda et al.

(10) Patent No.: US 7,016,612 B1
(45) Date of Patent: Mar. 21, 2006

(54) DIGITAL OPTICAL COMMUNICATION DEVICE AND METHOD FOR TRANSMITTING AND RECEIVING DATA WITH LIGHT EMISSION INTENSITY CONTROLLED

(75) Inventors: Yutaka Ikeda, Ikoma (JP); Takashi Nishimura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/322,108

(22) Filed: May 28, 1999

(30) Foreign Application Priority Data

May 28, 1998 (JP) .............................. 10-146789
May 11, 1999 (JP) .............................. 11-130186

(51) Int. Cl.
*H04B 10/00* (2006.01)

(52) U.S. Cl. ..................................... 398/137; 398/129
(58) Field of Classification Search ................ 359/152, 359/153, 154; 398/118–131, 135–139
See application file for complete search history.

(56) References Cited

U.S. PATENT DOCUMENTS

| | | | | |
|---|---|---|---|---|
| 5,822,099 A | * | 10/1998 | Takamatsu ................... | 359/110 |
| 6,104,512 A | * | 8/2000 | Batey et al. ................. | 340/7.54 |
| 6,188,494 B1 | * | 2/2001 | Minteer ....................... | 359/152 |
| 6,212,311 B1 | * | 4/2001 | Tomita ........................ | 359/154 |
| 6,246,499 B1 | * | 6/2001 | Kunito et al. ................ | 359/152 |
| 6,285,481 B1 | * | 9/2001 | Palmer ........................ | 359/110 |
| 6,307,659 B1 | * | 10/2001 | Gilliland et al. ............ | 359/152 |

FOREIGN PATENT DOCUMENTS

| | | |
|---|---|---|
| JP | 6-252853 | 9/1994 |
| JP | 9-069817 | 3/1997 |

* cited by examiner

*Primary Examiner*—Agustin Bello
(74) *Attorney, Agent, or Firm*—David G. Conlin; William J. Daley, Jr.; Edwards, Angell, Palmer & Dodge LLP

(57) ABSTRACT

A digital optical communication device includes an optical reception circuit converting an optical signal received from any external source to an electric signal, a decoding circuit decoding the electric signal resultant from conversion by the optical reception circuit and judging whether or not the decoding is normally completed, a reception light intensity level judgement circuit judging an intensity level of received light based on the electric signal, a coding circuit coding transmission data, and an optical transmission circuit determining a light emission intensity based on result of the judgement by the reception light intensity level judgement circuit and on result of the judgement by the decoding circuit, and converting the transmission data coded by the coding circuit to an optical signal with the light emission intensity. The optical transmission circuit determines the light emission intensity based on the result of judgement by the reception light intensity level judgement circuit and on the result of judgement by the decoding circuit, so that the light emission intensity can appropriately be controlled and the power consumption can be reduced.

23 Claims, 27 Drawing Sheets

AGC : Auto Gain Control
PRE : Preamble
STA : Start Flag
DATA : DATA
CRC : Cyclic Redundancy Check
STO : Stop Flag

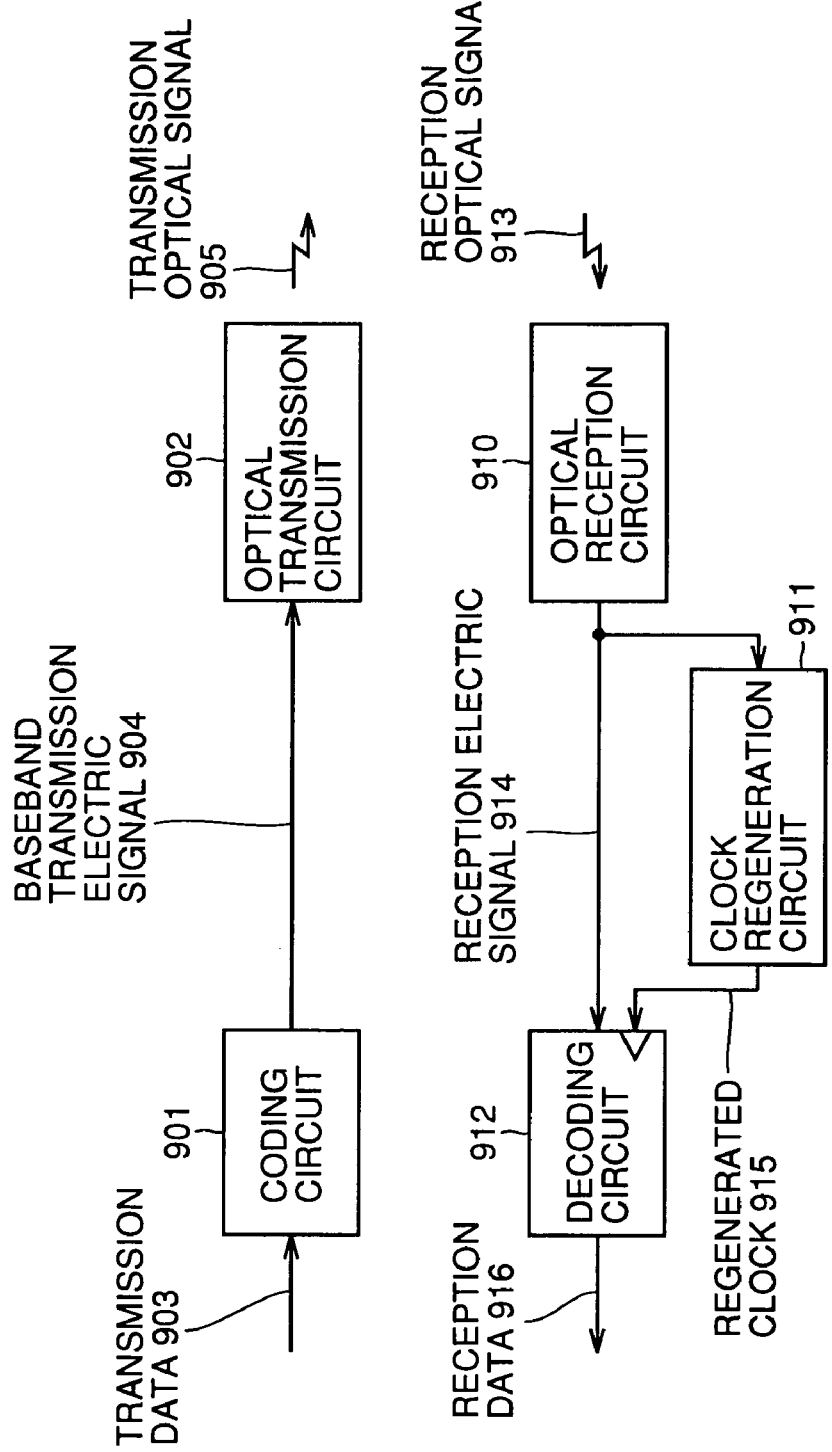

| PRIMARY STATION LIGHT EMISSION INTENSITY CONTROL SIGNAL | | LIMIT RESISTOR SELECTION SWITCH | | | |
|---|---|---|---|---|---|
| Txcnt1 | Txcnt0 | SW1 | SW2 | SW3 | SW4 |
| 1 | 1 | Off | Off | Off | On |
| 1 | 0 | Off | Off | On | Off |
| 0 | 1 | Off | On | Off | Off |
| 0 | 0 | On | Off | Off | Off |

| COUNT VALUE | RECEPTION LIGHT INTENSITY LEVEL JUDGEMENT SIGNAL | |
| --- | --- | --- |
| | Rxlevel1 | Rxlevel0 |
| 20~ | 1 | 1 |
| 16~19 | 1 | 0 |
| ~15 | 0 | 1 |

DIGITAL OPTICAL COMMUNICATION DEVICE AND METHOD FOR TRANSMITTING AND RECEIVING DATA WITH LIGHT EMISSION INTENSITY CONTROLLED

BACKGROUND OF THE INVENTION

1. Field of the Invention

The present invention relates to a digital optical communication device and a method for transmitting and receiving data by infrared ray, and particularly to a digital optical communication device and a method for communication with the intensity of emitted light controlled in transmitting data.

2. Description of the Background Art

The conventional optical communication system is roughly classified into a communication system using a subcarrier wave and a communication system without using the subcarrier wave. The subcarrier wave refers to a carrier wave which is generated in a pseudo way by turning on/off the light at a certain cycle. A rectangular wave or a sine wave of the light which is simply turned on/off is often substituted for the subcarrier wave. A method of transmitting data for communication without using the subcarrier wave by changing the waveform according to a certain rule depending on the data is called a baseband communication system. On the other hand, a method of transmitting data for communication by changing any of the amplitude, phase and frequency of the subcarrier wave depending on the data is called a carrier band communication system. Among carrier band modulation systems, the simplest one changes the amplitude. Such a system is referred to as an ASK (Amplitude-Shift Keying) system.

FIG. 1 shows a format of a packet employed in a conventional optical communication system. An optical communication device on the transmitter side generates a packet by adding a start flag (STA) to the head of a data field and adding a stop flag (STO) to the end of the data field and transmits the packet. An optical communication device on the receiver side detects the start flag and performs a reception process by recognizing as data the field extending from the start flag to the stop flag. As shown in FIG. 1, an auto gain control (AGC) field and a preamble (PRE) field may be added in front of the start flag. Further, a CRC (Cyclic Redundancy Check) may be added in order to detect any error in a transmission channel.

FIG. 2A is a schematic block diagram showing a structure of a transmitter section of a conventional baseband optical communication device. The transmitter section includes a coding circuit 901 coding a transmission data 903 and outputting the coded signal, and an optical transmission circuit 902 converting a baseband transmission electric signal 904 supplied from coding circuit 901 to an optical signal (transmission optical signal 905) and outputting the converted signal.

FIG. 2B is a schematic block diagram illustrating a structure of a receiver section of the conventional baseband optical communication device. The receiver section includes an optical reception circuit 910 which receives an optical signal (reception optical signal 913) from any external source, converts the signal to an electric signal and outputs it, a clock regeneration circuit 911 which extracts a clock component from the reception electric signal 914 supplied from optical reception circuit 910 and outputs the clock component, and a decoding circuit 912 which regenerates a reception data 916 from the regenerated clock 915 supplied from clock regeneration circuit 911 and reception electric signal 914 supplied from optical reception circuit 910. Optical reception circuit 910 converts reception optical signal 913 to the electric signal, performs processes such as noise elimination, amplification, waveform reshaping, and thereafter outputs the signal as reception electric signal 914.

FIG. 3A is a schematic block diagram illustrating a structure of a transmitter section of a conventional ASK optical communication device. The transmitter section includes a coding circuit 901 coding a transmission data 903 and outputting the coded signal, a modulation circuit 920 which performs ASK modulation by superimposing a subcarrier wave on a baseband transmission electric signal 904 supplied from coding circuit 901, and an optical transmission circuit 902 which converts an ASK transmission electric signal 921 supplied from modulation circuit 920 to an optical signal (transmission optical signal 905) and outputs the optical signal.

FIG. 3B is a schematic block diagram illustrating a receiver section of the conventional ASK optical communication device. The receiver section includes an optical reception circuit 930 which converts an optical signal (reception optical signal 913) received from any external source to an electric signal and outputs the electric signal, a clock regeneration circuit 911 which extracts a clock component from the reception electric signal 914 supplied from optical reception circuit 930 and outputs the clock component, and a decoding circuit 912 which regenerates a reception data 916 from the regenerated clock 915 supplied from clock regeneration circuit 911 and reception electric signal 914 supplied from optical reception circuit 930. Optical reception circuit 930 converts reception optical signal 913 to the electric signal, performs processes such as noise elimination, amplification, waveform shaping (elimination of subcarrier wave), and thereafter outputs the electric signal as reception electric signal 914.

FIG. 4 illustrates a circuit structure of optical transmission circuit 902 of the conventional ASK optical transmission device shown in FIG. 3A. Optical transmission circuit 902 includes a light emitting device 935, and a drive circuit 936 which drives light emitting device 935. Drive circuit 936 includes a transistor Q1 having its emitter terminal connected to the ground, a resistor element R1 connected to the base terminal of transistor Q1, and a resistor element R2 connected between light emitting device 935 and the collector terminal of transistor Q1. Light emitting device 935 is formed of a light emitting diode (LED), a laser diode (LED) or the like.

ASK transmission electric signal 921 supplied from modulation circuit 920 is supplied to the base terminal of transistor Q1 via resistor element R1. When ASK transmission electric signal 921 is at a high level (hereinafter referred to as H level), transistor Q1 is turned on to allow electric current to flow through light emitting device 935 and accordingly light is emitted. When ASK transmission electric signal 921 is at a low level (hereinafter referred to as L level), transistor Q1 is turned off and accordingly, no electric current flows through light emitting device 935 and no light is emitted. Optical transmission circuit 902 thus converts ASK transmission electric signal 921 to transmission optical signal 905.

FIG. 5 is a schematic diagram illustrating a structure of optical reception circuit 930 of the conventional ASK optical reception device. Optical reception circuit 930 includes a light receiving device 940 which receives reception optical signal 913 and converts the signal to an electric signal, an amplify circuit 941 which amplifies the electric signal output from light receiving device 940, a bandpass filter (BPF) 942 which extracts a subcarrier component of the amplified signal supplied from amplify circuit 941, a noise level detection circuit 943 which detects the noise level of the signal supplied from bandpass filter 942, an envelope detection circuit 944 which performs an envelope detection process for the signal supplied from bandpass filter 942 to eliminate the subcarrier component, a signal detection level generation circuit 945 which detects the level of the signal supplied from envelope detection circuit 944, and a comparison circuit 946 which compares the signal supplied from envelope detection circuit 946 with the signal supplied from the signal detection level generation circuit 945 to output reception electric signal 914 which has been subjected to the waveform reshaping process.

Light receiving device 940 is formed of a photodiode or the like. Noise level detection circuit 943 formed of an integrator having a long time constant detects the noise level by integrating continually generated noises for a relatively long time period. When the noise level output from noise level detection circuit 943 increases, an amplification factor is reduced to prevent saturation due to the noises under the control by amplify circuit 941.

The signal supplied from bandpass filter 942 is resistively divided according to a predetermined ratio and supplied to envelope detection circuit 944. Signal detection level generation circuit 945 having a short time constant captures the peak of the output signal from envelope detection circuit 944. The output signal from signal detection level generation circuit 945 is resistively divided according to a predetermined ratio and supplied to comparison circuit 946.

In general, a light emission intensity, namely the intensity of light radiated from the light emitting device increases as the current flowing through the light emitting device increases. However, the current flowing through light emitting device 935 in the conventional optical transmission circuit 902 is constant as shown in FIG. 4. The value of electric current of light emitting device 935 is usually determined by light emission power required for achieving a desired communication distance. For example, if the desired communication distance is 1 m, optical transmission circuit 902 always emits light with the light emission intensity which enables transmission to any optical transmission device 1 m away from itself. Therefore, if the transmission distance is shorter, the transmission is carried out with an unnecessarily stronger light emission intensity. Accordingly, unnecessarily large current flow through light emitting device 935 leads not only to wasteful power consumption, but to degradation of characteristics and shorter lifetime of the light emitting device, and consequently, the light emitting device radiates an unnecessary interference wave to another optical communication device.

Those inventions disclosed in Japanese Patent Laying-Open Nos. 6-252853 and 9-69817 solve such a problem.

An optical communication device disclosed in the Japanese Patent Laying-Open No. 6-252853 includes a light receiving device which receives an optical signal and converts the optical signal to an electric signal, an amplifier which amplifies the electric signal supplied from the light receiving device and outputs a level signal indicating the strength of the received signal, and a judge control circuit which judges the level of the received signal by the level signal supplied from the amplifier to control a driver circuit which drives a light emitting device.

An optical communication device disclosed in the Japanese Patent Laying-Open No. 9-69817 includes a first transmission and reception device, and a second transmission and reception device. The first transmission and reception device includes a light emitting device, a light emission drive control circuit which controls light emission drive of the light emitting device, and a reception unit which receives light emission intensity information transmitted from the second transmission and reception device. The second transmission and reception device includes a light receiving device, a light reception intensity detection circuit which detects the light reception intensity, namely the intensity of the light received by the light receiving device, and a transmission unit which transmits the light reception intensity information to the first transmission and reception device. The first transmission and reception device adjusts the light emission intensity of the light emitting device according to the light reception intensity information supplied from the second transmission and reception device.

Problems are described below of those inventions disclosed in the Japanese Patent Laying-Open Nos. 6-252853 and 9-69817 described above.

The first problem is that the control information of the light emission intensity is generated only from the output signal of the amplify circuit. In the communication using the light, the background light from the sunlight, inverter fluorescent lamp or the like is incident on the light receiving device to cause noise called shot noise. The sunlight called white noise leads to a noise source having an infinite extent of frequencies. The inverter fluorescent lamp leads to a noise source having frequency components reaching to several hundreds KHz.

The light receiving device photoelectrically converts the received light whether or not the incident light is a data signal or any noise. Therefore, the amplify circuit amplifies a signal in which the data signal and the noise are mixed. Even if the noise is large, in other words, even if the signal-to-noise ratio is low and a stronger light reception intensity is required, it is judged that the light reception intensity is strong by receiving the signal which is generated by amplifying the noise, and thus the light emission intensity is likely to be reduced.

The second problem is that a stable adjustment of the light emission intensity is impossible when two corresponding optical communication devices simultaneously control the emission of the light. For example, when optical communication is done at close range, the first optical communication device receives an optical signal with a high light intensity from the second optical communication device, so that the first optical communication device supposes that the second optical communication device is doing communication at a close range to transmit an optical signal to the second optical communication device with reduced light emission intensity. On the other hand, the second optical communication device receives the optical signal with the low light intensity from the first optical communication device, so that it supposes that the first optical communication device is located at a long distance to transmit an optical signal to the first optical communication device with increased light intensity. Consequently, both optical communication devices repeatedly adjust the light emission intensity, leading to erroneous adjustment of the light emission intensity by both of the optical communication devices.

The third problem is that, if the two optical communication devices have different receiving sensitivities, an efficient adjustment of the light emission intensity is impossible. For example, as bidirectional optical communication devices, the first and second optical communication devices having different receiving sensitivities are supposed to do optical communication with the same light intensity.

Although there are various factors which determine the receiving sensitivity, the amplification factor is herein defined as the factor where a higher amplification factor corresponds to a superior receiving sensitivity and a lower amplification factor corresponds to an inferior receiving sensitivity. Further, it is supposed that the first optical communication device is a battery-driven equipment and adjust the light intensity, and the second optical communication device is an AC (Alternating Current)-connected equipment and does not adjust the light intensity, and that the first optical communication device has a superior receiving sensitivity and the second optical communication device has an inferior receiving sensitivity. The first optical communication device transmits an optical signal with a lower light emission intensity to the second optical communication device since the first optical communication device has the superior receiving sensitivity and is thus able to fully receive the optical signal emitted from the second optical communication device. However, the first optical communication device cannot properly receive the optical signal from the second optical communication device since the second optical communication device has the inferior receiving sensitivity, possibly leading to the state in which the signal cannot be received.

Further, it is supposed that the first optical communication device has an inferior receiving sensitivity and the second optical communication device has a superior receiving sensitivity. If the first optical communication device receives an optical signal with the minimum light reception intensity which can be received from the second optical communication device, the first optical communication device transmits an optical signal with the maximum light emission intensity to the second optical communication device. On the other hand, the second optical communication device having the superior receiving sensitivity receives an optical signal with an unnecessarily high light reception intensity, leading to waste of electric power of the first optical communication device.

The fourth problem is that no consideration is taken as to when the judgement should be made of light reception intensity, namely the intensity of the optical signal received from an optical communication device on the transmitter side. A light receiving device of the optical communication device receives, except for a data signal from any secondary station, background light such as the sunlight and the light from an inverter fluorescent lamp. Consequently, the intensity of the received light is judged on the basis of the background light incident on the optical communication device before the data signal is received from the secondary station and thus a proper control of the light emission intensity becomes impossible.

The fifth problem of the conventional art described above is that a specific circuit structure is not disclosed in those references although adjustment of the light emission intensity is described therein. For example, it is not clarified that how the transmitter section of the optical communication device adjusts the light intensity after the light emitting device receives the light emission intensity control signal. Further, the same is applied to the receiver section.

SUMMARY OF THE INVENTION

One object of the invention is to provide a digital optical communication device capable of reducing power consumption.

Another object of the invention is to provide a digital optical communication device capable of properly controlling the light emission intensity.

Still another object of the invention is to provide a digital optical communication device which can reduce the influence of noises due to background light such as sunlight and light from fluorescent lamp and properly control the light emission intensity.

A further object of the invention is to provide a digital optical communication method to achieve reduction of power consumption.

A further object of the invention is to provide a digital optical communication method which can properly control the light emission intensity.

A further object of the invention is to provide a digital optical communication method which can reduce the influence of noises due to background light such as sunlight and light from fluorescent lamp and properly control the light emission intensity.

According to one aspect of the invention, a digital optical communication device includes an optical reception circuit which converts an optical signal received from any external source to an electric signal, a decoding circuit which decodes the electric signal resultant from conversion by the optical reception circuit and judges whether or not the decoding is normally completed, a reception light intensity level judge circuit which judges an intensity level of received light based on the electric signal resultant from conversion by the optical reception circuit, a coding circuit which encodes a transmission data, and an optical transmission circuit which determines a light emission intensity based on the result of judgement by the reception light intensity level judge circuit and the result of judgement by the decoding circuit, and converts the transmission data coded by the coding circuit to an optical signal with the light emission intensity.

The optical transmission circuit determines the light emission intensity based on the result of judgement by the reception light intensity level judge circuit and the result of judgement by the decoding circuit, so that the light emission intensity can properly be controlled to reduce consumption power.

According to another aspect of the invention, a digital optical communication device includes an optical reception circuit which converts an optical signal received from any external source to an electric signal, a decoding circuit which decodes the electric signal resultant from conversion by the optical reception circuit and extracts reception light intensity information of a secondary station, a coding circuit which encodes a transmission data, and an optical transmission circuit which determines a light emission intensity based on the reception light intensity information of the secondary station extracted by the decoding circuit, and converts the transmission data coded by the coding circuit to an optical signal with the light emission intensity.

The optical transmission circuit determines the light emission intensity based on the reception light intensity information of the secondary station extracted by the decoding circuit, so that control of the light emission intensity is possible without any influence due to a communication distance.

According to still another aspect of the invention, a digital optical communication device includes an optical reception circuit which converts an optical signal received from any external source to an electric signal, a decoding circuit which decodes the electric signal resultant from conversion by the optical reception circuit and judges whether or not the decoding operation is normally completed, a reception light intensity level judge circuit which judges an intensity level of received light based on the electric signal resultant from conversion by the optical reception circuit, a coding circuit which generates a reception light intensity information of a primary station based on the result of judgement by the decoding circuit and the result of judgement by the reception light intensity level judge circuit, and encodes a transmission data and the reception light intensity information, and an optical transmission circuit which converts the reception light intensity information and transmission data coded by the coding circuit to an optical signal.

The optical transmission circuit converts the reception light intensity information and transmission data coded by the coding circuit to an optical signal, so that the reception light intensity information of the primary station can be sent to a secondary station and thus the light emission intensity of the secondary station can easily be controlled.

According to a further aspect of the invention, a digital optical communication device includes an optical reception circuit which converts an optical signal received from any external source to an electric signal, a decoding circuit which decodes the electric signal resultant from conversion by the optical reception circuit, extracts a requested light emission intensity from a secondary station and judges whether or not the decoding operation is normally completed, a reception light intensity level judge circuit which judges a reception light intensity level based on the electric signal resultant from conversion by the optical reception circuit, a secondary station request light emission intensity control signal generation circuit which generates light emission intensity information requested to the secondary station based on the result of judgement by the decoding circuit and the reception light intensity level judged by the reception light intensity level judge circuit, a coding circuit which encodes a transmission data and the light emission intensity information requested to the secondary station generated by the secondary station request light emission intensity control signal generation circuit, and an optical transmission circuit which converts the transmission data and light emission intensity information requested to the secondary station that are coded by the coding circuit to an optical signal with the requested light emission intensity from the secondary station that is extracted by the decoding circuit.

The optical transmission circuit converts them to the optical signal based on the light emission intensity requested from the secondary station that is extracted by the decoding circuit, so that control of the light emission intensity can easily be made. Further, the optical transmission circuit transmits the transmission data and the light emission intensity information requested to the secondary station that are coded by the coding circuit, so that the light emission intensity control at the secondary station can easily be made.

According to a further aspect of the invention, a digital optical communication device includes an optical reception circuit which converts an optical signal which is received from any external source to an electric signal, a decoding circuit which decodes the electric signal resultant from conversion by the optical reception circuit, extracts a secondary station light emission intensity information, and judges whether or not the decoding operation is normally completed, a reception light intensity level judge circuit which judges a reception light intensity level based on the electric signal resultant from conversion by the optical reception circuit, a primary station light emission intensity control signal generation circuit which determines a light emission intensity of a primary station based on the secondary station light emission intensity information extracted by the decoding circuit, the result of judgement by the decoding circuit, and the result of judgement by the reception light intensity level judge circuit, a coding circuit which encodes a transmission data and information on the light emission intensity of the primary station determined by the primary station light emission intensity control signal generation circuit, and an optical transmission circuit which converts the transmission data and the light emission intensity information that are coded by the coding circuit to an optical signal with the light emission intensity determined by the primary station light emission intensity control signal generation circuit.

The primary station light emission intensity control signal generation circuit determines the light emission intensity of the primary station based on the secondary station light emission intensity information extracted by the decoding circuit, the result of judgement by the decoding circuit, and the result of judgement by the reception light intensity level judge circuit, so that a further appropriate control of the light emission intensity is possible.

According to a further aspect of the invention, a digital optical communication method includes the steps of converting an optical signal received from any external source to an electric signal, decoding the electric signal resultant from the conversion and judging whether or not the decoding operation is normally completed, judging an intensity level of received light based on the electric signal, coding a transmission data, and determining a light emission intensity based on the judged intensity level of the received light and on the result of judgement about whether or not the decoding operation is normally completed and converting the coded transmission data to an optical signal with the light emission intensity.

The light emission intensity is determined based on the judged intensity level of the received light and on the result of determination as to whether or not the decoding is normally completed, so that an appropriate control of the light emission intensity is possible to reduce the power consumption.

According to a further aspect of the invention, a digital optical communication method includes the steps of converting an optical signal received from any external source to an electric signal, decoding the electric signal resultant from the conversion and extracting reception light intensity information of a secondary station, coding a transmission data, and determining a light emission intensity based on the extracted reception light intensity information of the secondary station and converting the coded transmission data to an optical signal with the light emission intensity.

The light emission intensity is determined based on the extracted reception light intensity information of the secondary station, so that control of the light emission intensity is possible without influence of the communication distance.

According to a further aspect of the invention, a digital optical communication method includes the steps of converting an optical signal which is received from any external source to an electric signal, decoding the electric signal resultant from the conversion and judging whether or not the decoding operation is normally completed, judging an intensity level of received light based on the electric signal, generating reception light intensity information of a primary station based on the judged intensity level of the received light and on the result of judgement as to whether or not the decoding is normally completed and coding a transmission data and the reception light intensity information, and converting the coded reception light intensity information and transmission data to an optical signal.

The coded reception light intensity information and transmission data are converted to an optical signal, so that the reception light intensity information of the primary station can be sent to a secondary station to achieve an easy control of the light emission intensity at the secondary station.

According to a further aspect of the invention, a digital optical communication method includes the steps of converting an optical signal received from any external source to an electric signal, decoding the electric signal resultant from the conversion, extracting a light emission intensity requested from a secondary station, and judging whether or not the decoding operation is normally completed, judging a reception light intensity level based on the electric signal resultant from the conversion, generating a light emission intensity information requested to the secondary station based on the result of judgement as to whether or not the decoding is normally completed and on the judged reception light intensity level, coding a transmission data and the generated light emission intensity information requested to the secondary station, and converting the coded transmission data and the light emission intensity information requested to the secondary station to an optical signal with the extracted light emission intensity requested from the secondary station.

Conversion to the optical signal is performed using the extracted light emission intensity requested from the secondary station, so that the light emission intensity can easily be controlled. Further, the coded transmission data and light emission intensity information requested to the secondary station are sent, so that the light emission intensity can easily be controlled at the secondary station.

According to a further aspect of the invention, a digital optical communication method includes the steps of converting an optical signal received from any external source to an electric signal, decoding the electric signal resultant from the conversion to extract a secondary station light emission intensity and judging whether or not the decoding operation is normally completed, judging a reception light intensity level based on the electric signal, determining a light emission intensity of a primary station based on the extracted secondary station light emission intensity, on the result of judgement as to whether or not the decoding is normally completed, and on the judged reception light intensity level, coding a transmission data and information on the determined light emission intensity of the primary station, and converting the coded transmission data and light emission intensity information to an optical signal with the determined light emission intensity.

The light emission intensity of the primary station is determined based on the extracted secondary station light emission intensity, the result of judgement as to whether or not decoding is normally completed, and on the judged reception light intensity level, so that a further appropriate control of the light emission intensity becomes possible.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B are schematic block diagrams respectively illustrating a transmitter section and a receiver section in a conventional baseband optical communication device.

FIG. 19 illustrates a circuit structure of a drive circuit 203a.

FIG. 20 illustrates a relation between a primary station light emission intensity control signal 502 and the state of a limit resistor selection switch 604.

DESCRIPTION OF THE PREFERRED EMBODIMENTS

Figure 6:
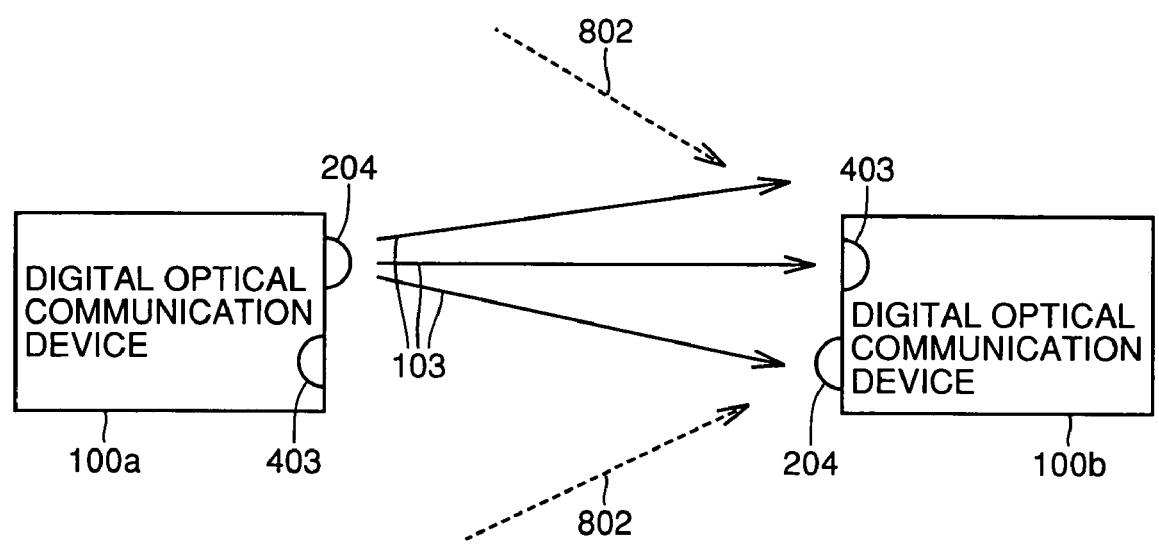
FIG. 6 is an example of an external view of an optical communication device according to the first to the fourth embodiments of the invention.

Optical communication devices according to the first to the fourth embodiments of the invention are applied to infrared ray space transmission. Referring to FIG. 6, digital optical communication devices corresponding to each other are provided. A light emitting device 204 of an optical communication device 100a of a first station emits a transmission optical signal 103 to an optical communication device 100b of a second station. The optical communication device of the second station receives, when it receives transmission optical signal 103 by a light receiving device 403, noise 802 such as background light together with transmission optical signal 103. The optical communication devices in the first to the fourth embodiments are hereinafter described in detail.

First Embodiment

An optical communication device in the first embodiment of the invention is implemented as a set of optical communication devices, with one optical communication device (hereinafter referred to as a first station) adjusting a light emission intensity and the other optical communication device (hereinafter referred to as a second station) making no adjustment to the light emission intensity. The optical communication device of the first embodiment is chiefly related to the optical communication device of the first station. For example, the optical communication device of the first station is a battery-driven optical communication device, and the optical communication device of the second station is an AC-connected optical communication device. Specifically, the optical communication device of the first station is a remote control equipment, and the optical communication device of the second station is any domestic electrical appliance such as the television receiver. The optical communication device of the second station may be implemented as the conventional optical communication device illustrated in FIGS. 2A and 2B. The optical communication between the optical communication device of the first station and the optical communication device of the second station is performed according to the baseband system.

Figure 7:
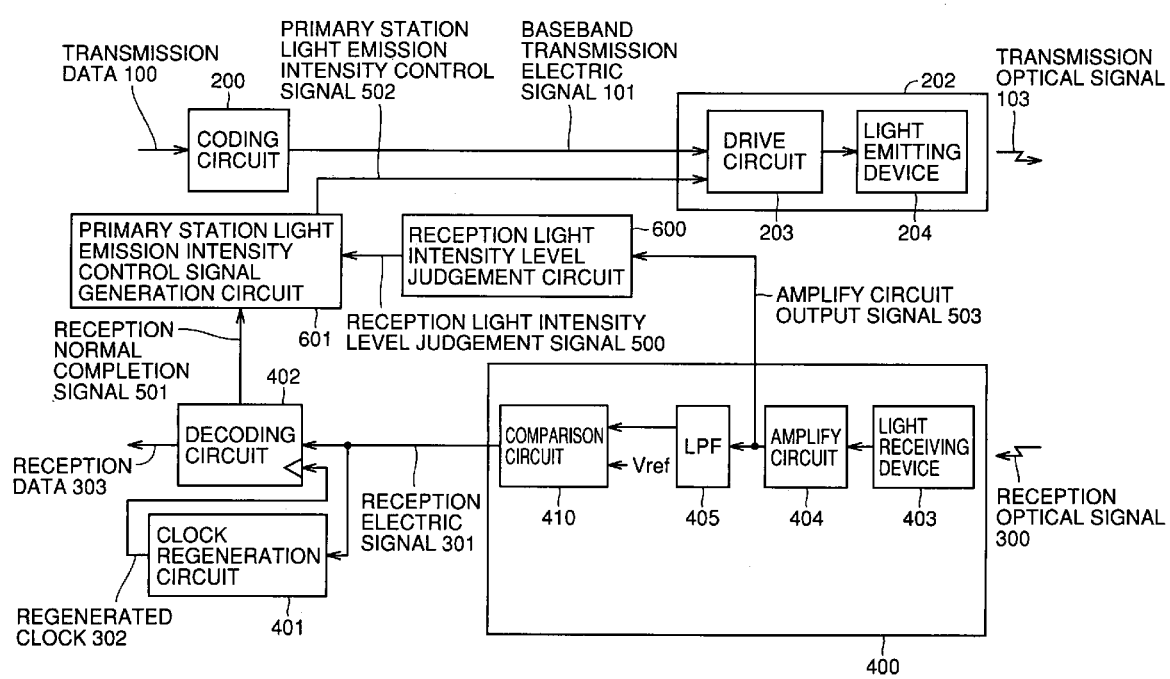
FIG. 7 is a schematic block diagram illustrating a structure of the optical communication device according to the first embodiment of the invention.

FIG. 7 is a schematic block diagram illustrating a structure of the optical communication device in the first embodiment of the invention. The optical communication device includes a coding circuit 200 coding a transmission data 100, an optical transmission circuit 202 converting a baseband transmission electric signal 101 supplied from coding circuit 200 to an optical signal (transmission optical signal 103) and outputting the converted signal to any external unit, an optical reception circuit 400 converting a reception optical signal 300 received from any external unit to an electric signal (reception electric signal 301) and outputting the converted signal, a clock regeneration circuit 401 extracting a clock signal from reception electric signal 301 supplied from optical reception circuit 400 and outputting the clock signal, a decoding circuit 402 decoding a reception data based on reception electric signal 301 supplied from optical reception circuit 400 and on the clock signal supplied from clock regeneration circuit 401, and outputting a reception normal completion signal (hereinafter referred to as Rxdone) indicating normal completion of data reception, a reception light intensity level judgment circuit 600 inputting an amplify circuit output signal 503 supplied from optical reception circuit 400 to judge an intensity level of received light, and a primary station light emission intensity control signal generation circuit 601 based on reception normal completion signal 501 supplied from decoding circuit 402 and a reception light intensity level judgement signal 500 for instructing optical transmission circuit 202 about a light emission intensity. Optical transmission circuit 202 includes a light emitting device 204, and a drive circuit 203 adjusting the light emission intensity based on a primary station light emission intensity control signal 502 supplied from primary station light emission intensity control signal generation circuit 601 to cause light emitting device 204 to convert baseband transmission electric signal 101 supplied from coding circuit 200 to an optical signal. Light emitting device 204 is formed of a light emitting diode (LED), a laser diode (LD) or the like.

Optical reception circuit 400 includes a light receiving device 403 receiving reception optical signal 300 and converting the signal to an electric signal, an amplify circuit 404 amplifying the electric signal supplied from light receiving device 403 and outputting the amplified signal, a low-pass filter (LPF) 405 extracting a data signal component from amplify circuit output signal 503 supplied from amplify circuit 404 and outputting the extracted component, and a comparison circuit 410 comparing the signal supplied from low-pass filter 405 with a reference voltage Vref to generate reception electric signal 301. Light receiving device 403 is formed of a photodiode or the like. Low-pass filter 405 eliminates a shot noise generated from any background light such as sunlight and light from fluorescent lamp and any thermal noise generated within optical reception circuit 400, and extracts the data signal component.

Figure 8:
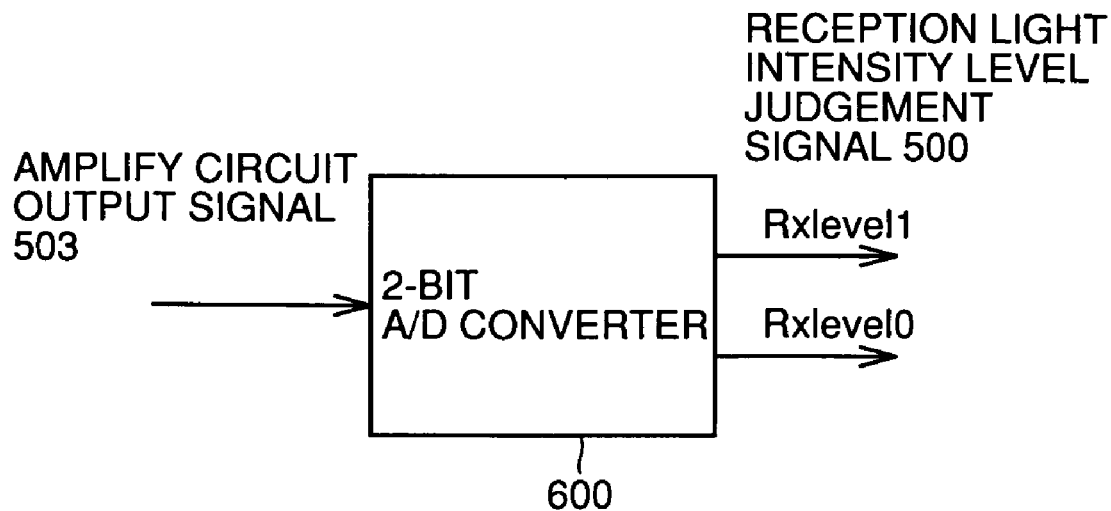
FIG. 8 illustrates a circuit structure of a reception light intensity level judgement circuit 600.
Figure 9:
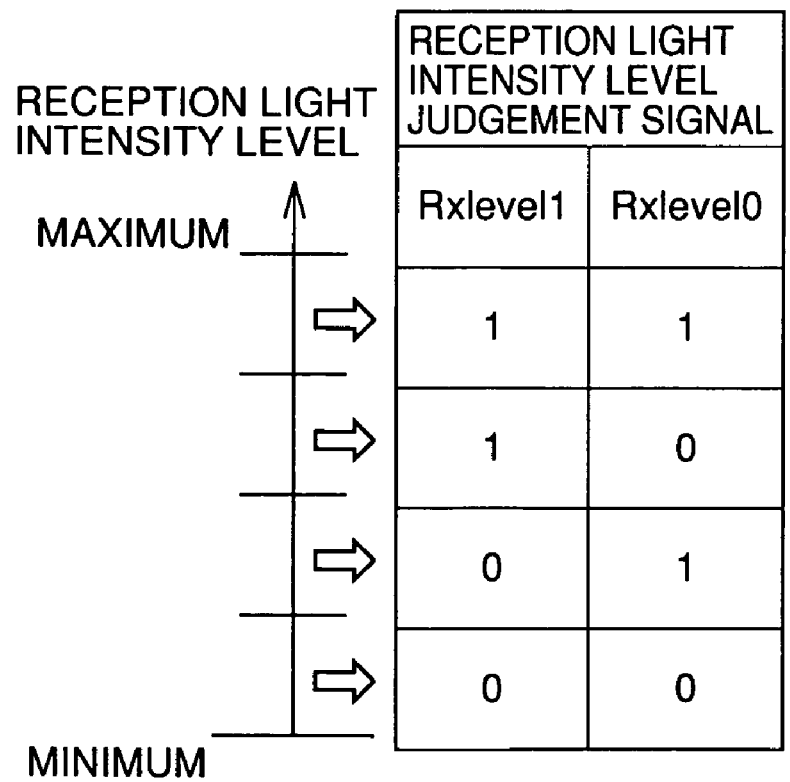
FIG. 9 illustrates a relation between a reception light intensity level and a reception light intensity level judgement signal.

FIG. 8 shows a structure of reception light intensity level judgement circuit 600. Reception light intensity level judgement circuit 600 formed of a 2-bit A/D (Analog/Digital) converter converts amplify circuit output signal 503 to a 2-bit reception light intensity level judgement signal (Rxlevel1, Rxlevel0) in the A/D manner and outputs it. FIG. 9 shows a relation between the reception light intensity level and the reception light intensity level judgment signal (Rxlevel1, Rxlevel0). The minimum reception light intensity level is represented by (Rxlevel1, Rxlevel0)=(0, 0), and the maximum reception light intensity level is represented by (Rxlevel1, Rxlevel0)=(1, 1), and the intermediate reception light level is represented by (0, 1) and (1, 0) for output.

Figure 10:
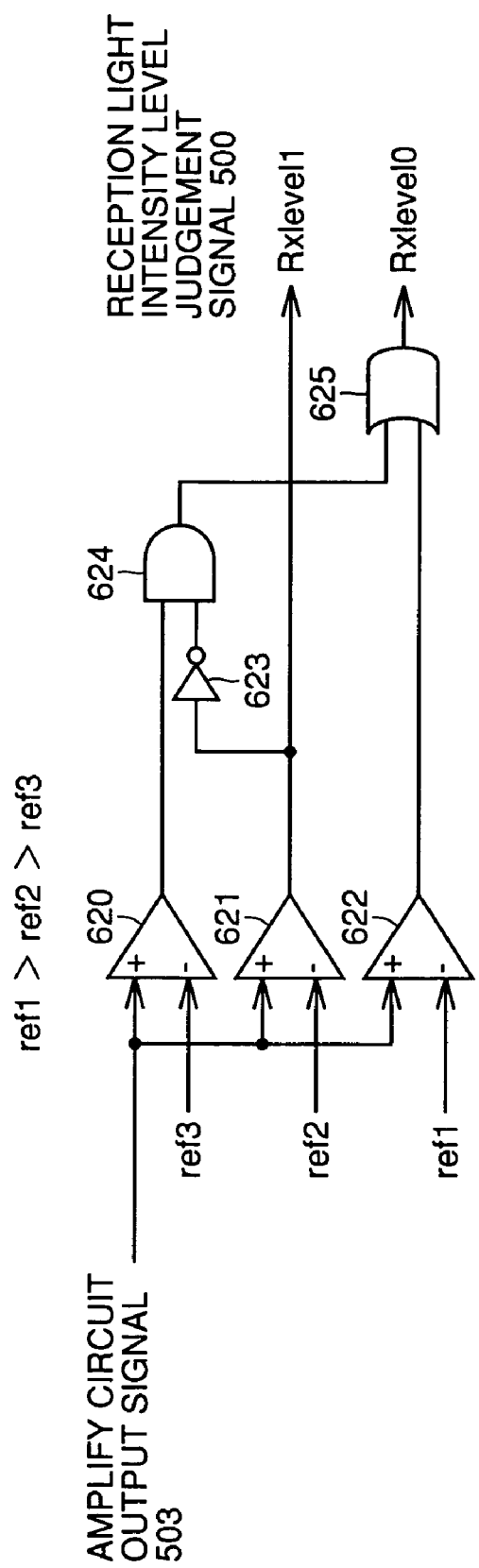
FIG. 10 illustrates another circuit structure of the reception light intensity level judgement circuit 600 shown in FIG. 7.

Reception light intensity level judgement circuit 600 shown in FIG. 8 may be formed of the circuit shown in FIG. 10. The circuit includes comparators 620–622 that compare the voltage value of amplify circuit output signal 503 with reference voltage values ref3, ref2 and ref1 (ref1>ref2>ref3) respectively, an inverter 623, an AND circuit 624, and an OR circuit 625.

When the voltage value of amplify circuit output signal 503 is smaller than ref3, comparators 620–622 output L levels respectively, so that L levels are respectively supplied to Rxlevel1 signal and Rxlevel0 signal. When the voltage value of amplify circuit output signal 503 is larger than ref3 and smaller than ref2, comparator 620 outputs H level and comparators 621 and 622 respectively output L levels, so that AND circuit 624 supplies H level to cause OR circuit 625 to output H level. Consequently, L level is supplied to Rxlevel1 signal and H level is supplied to Rxlevel0 signal.

When the voltage value of amplify circuit output signal 503 is larger than ref2 and smaller than ref1, comparators 620 and 621 output H levels and comparator 622 outputs L level, so that AND circuit 624 outputs L level to cause OR circuit 625 to output L level. Consequently, H level is supplied to Rxlevel1 signal, and L level is supplied to Rxlevel0 signal. Further, when the voltage value of amplify circuit output signal 503 is higher than ref1, comparators 620–622 respectively output H levels so that AND circuit 624 outputs L level to cause OR circuit 625 to output H level. As a result, H levels are respectively supplied to Rxlevel1 signal and Rxlevel0 signal.

Figure 11:
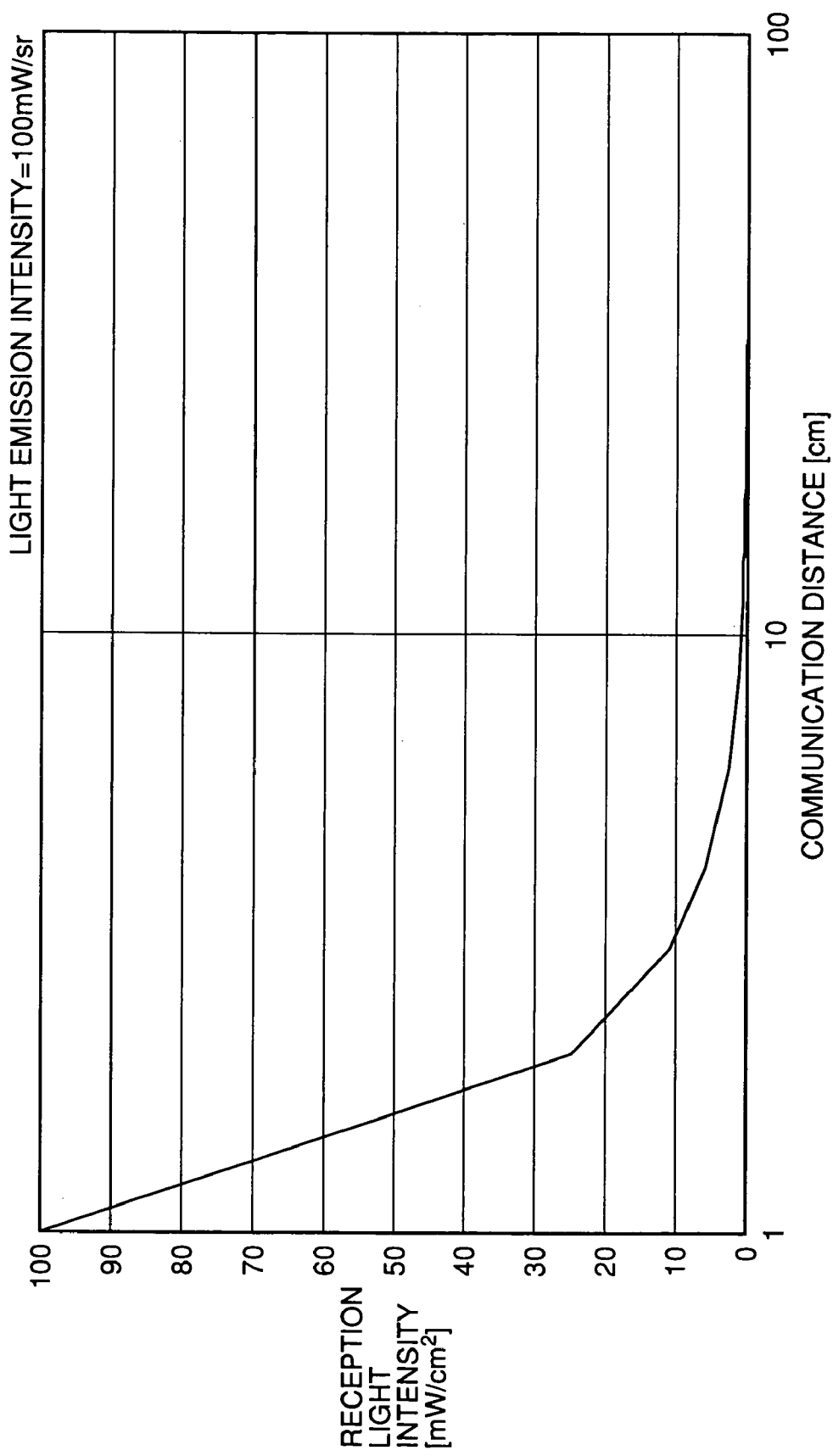
FIG. 11 illustrates a relation between a communication distance and a reception light intensity of the optical communication device according to the first embodiment of the invention.
Figure 12:
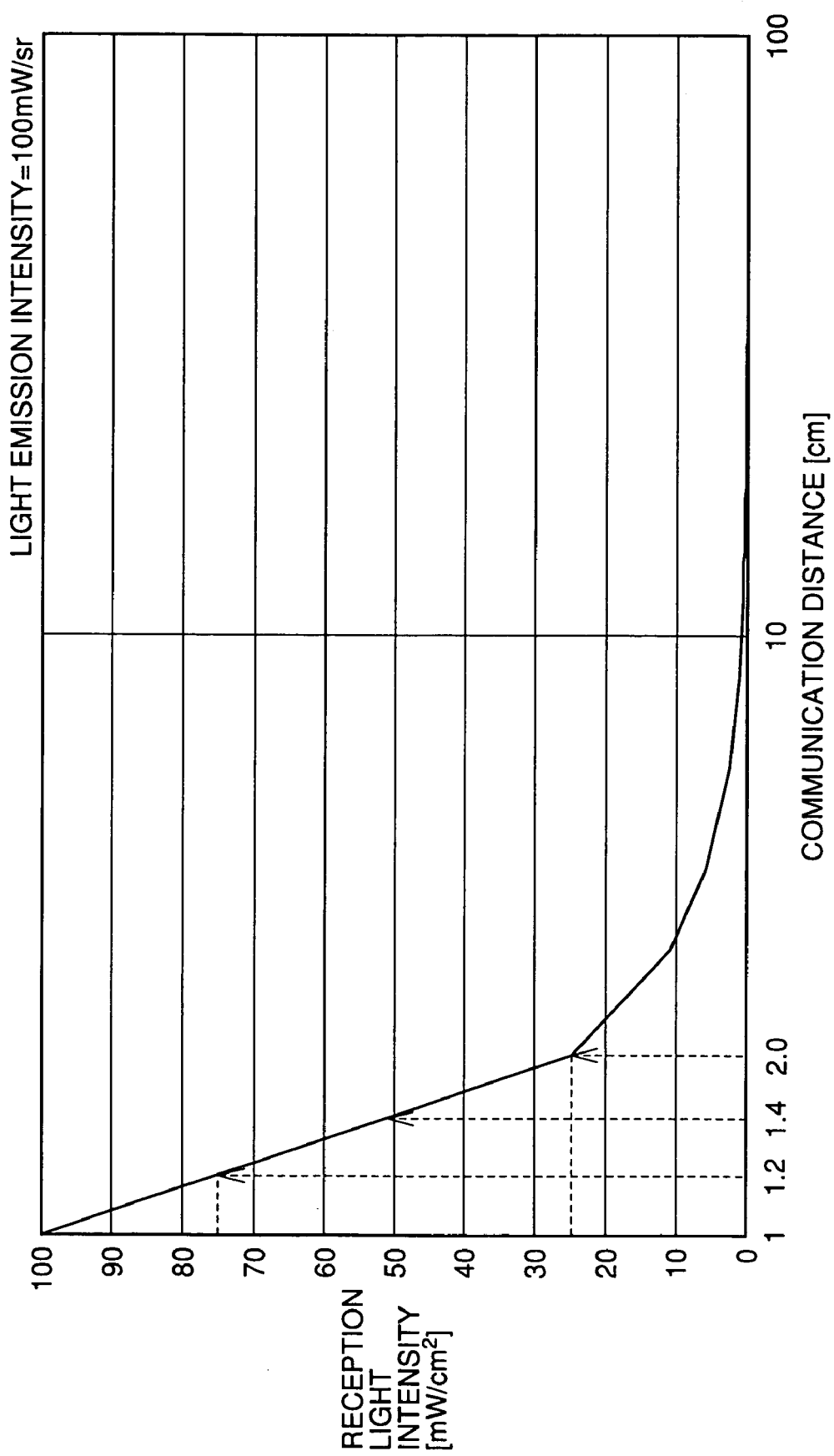
FIG. 12 shows in detail the relation between the communication distance and the reception light intensity of the optical communication device according to the first embodiment of the invention.

FIG. 11 shows a relation between the communication distance between optical communication devices and the intensity of received light. As shown in FIG. 11, the reception light intensity of the optical communication device is generally inversely proportional to the square of the communication distance. In some cases, the automatic gain control function of the amplify circuit may adjust the amplification factor depending on the intensity of the incident light. If the reception light intensity level judgement circuit 600 has a structure to judge the communication distance as inversely proportional to the reception light intensity, only the four patterns of the communication distance can be judged, namely 1.2 cm or less, 1.2–1.4 cm, 1.4–2 cm, and 2 cm or more as shown in FIG. 12. Accordingly, although fine adjustment of the light emission intensity is possible for the region (0–2 cm) in which the communication distance is relatively short, the light emission intensity cannot be adjusted for the communication distance longer than that distance and thus the light emission intensity cannot be adjusted according to the communication distance. If the circuit shown in FIG. 10 is employed, reference voltages ref1, ref2 and ref3 can be defined as arbitrary values to appropriately judge the reception light intensity level and to adjust the light emission intensity according to the communication distance.

Primary station light emission intensity control signal generation circuit 601 shown in FIG. 7 can be implemented by a logical circuit which satisfies the following logical expressions. In those expressions, "·" represents a logical product.

Txcnt0=Rxlevel0·Rxdone (1)

Txcnt1=Rxlevel1·Rxdone (2)

If reception normal completion signal 501 supplied from decoding circuit 402 is active (H level), primary station light emission intensity control signal generation circuit 601 outputs reception light intensity level judgement signal 500 as primary station light emission intensity control signal 502. If reception normal completion signal 501 supplied from decoding circuit 402 is inactive (L level), primary station light emission intensity control signal generation circuit 601 judges that the decoding operation cannot be normally achieved due to the large influence of noises due to background light or heat, and outputs primary station light emission intensity control signal 502 to increase the light emission intensity. In such a circuit structure, when the communication distance is long and accordingly the reception light intensity is low while noises due to the background light is large and thus the signal to noise ratio is low, in other words, when reception light intensity level judgement circuit 600 judges that the intensity level of the received light is high but actually the high intensity level is due to the noises, optical transmission circuit 202 is prevented from controlling to reduce the light emission intensity. Reduction of communication quality (code error rate) can be avoided by making the light emission intensity adjustment.

Figure 13:
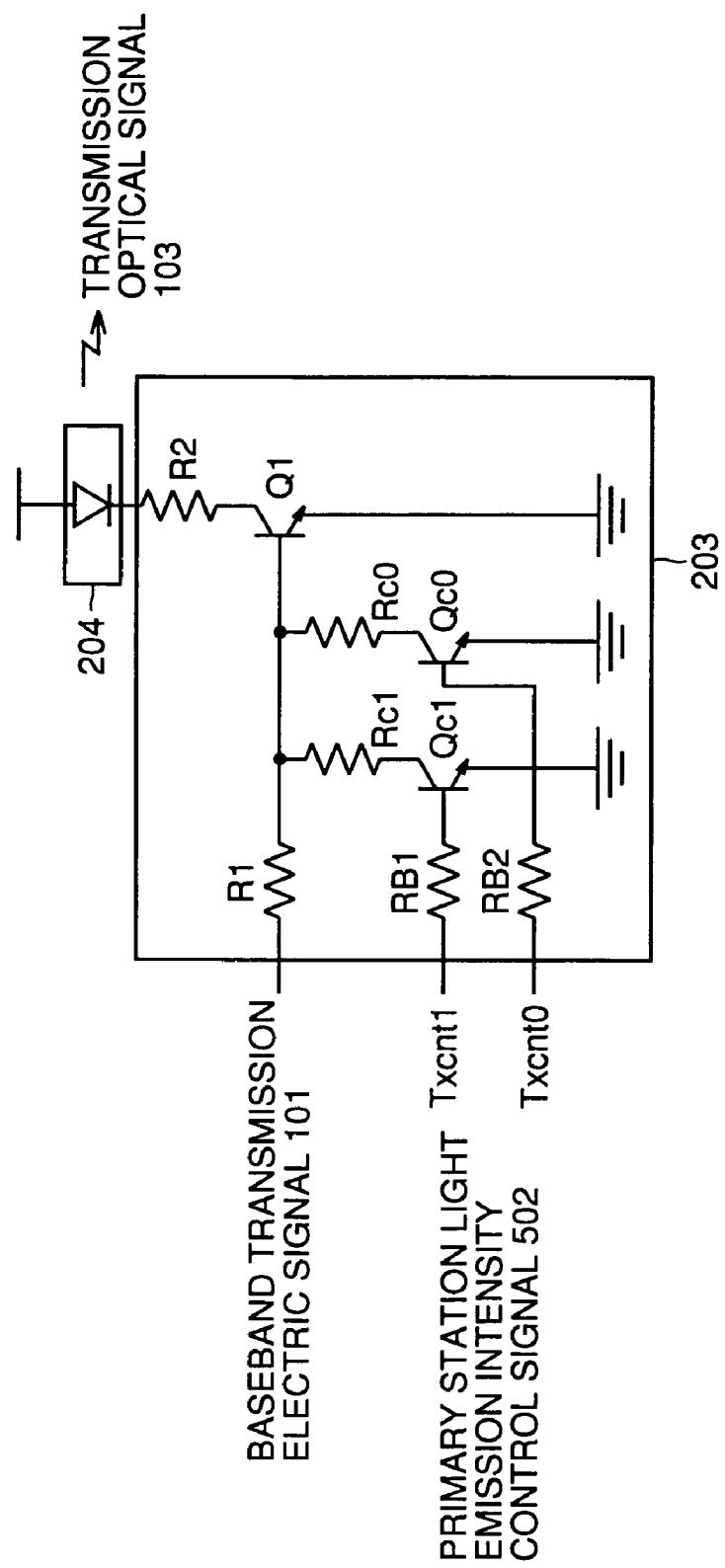
FIG. 13 shows a circuit structure of a drive circuit 203.

FIG. 13 shows a circuit structure of drive circuit 203. Drive circuit 203 includes transistors Q1, Qc0 and Qc1 having emitter terminals connected to the ground, a resistor element R1 connected in series between baseband transmission electric signal 101 and the base terminal of transistor Q1, a resistor element R2 connected in series between light emitting device 204 and the collector terminal of transistor Q1, a resistor element RB1 connected in series between Txcnt1 signal and the base terminal of transistor Qc1, a resistor element RB2 connected in series between Txcnt0 signal and the base terminal of transistor Qc0, a resistor element Rc1 having one terminal connected between resistor element R1 and the base terminal of transistor Q1 and the other terminal connected to the collector terminal of transistor Rc1, and a resistor element Rc0 having one terminal connected between resistor element R1 and the base terminal of transistor Q1 and the other terminal connected to the collector terminal of transistor Rc0.

Figure 14:
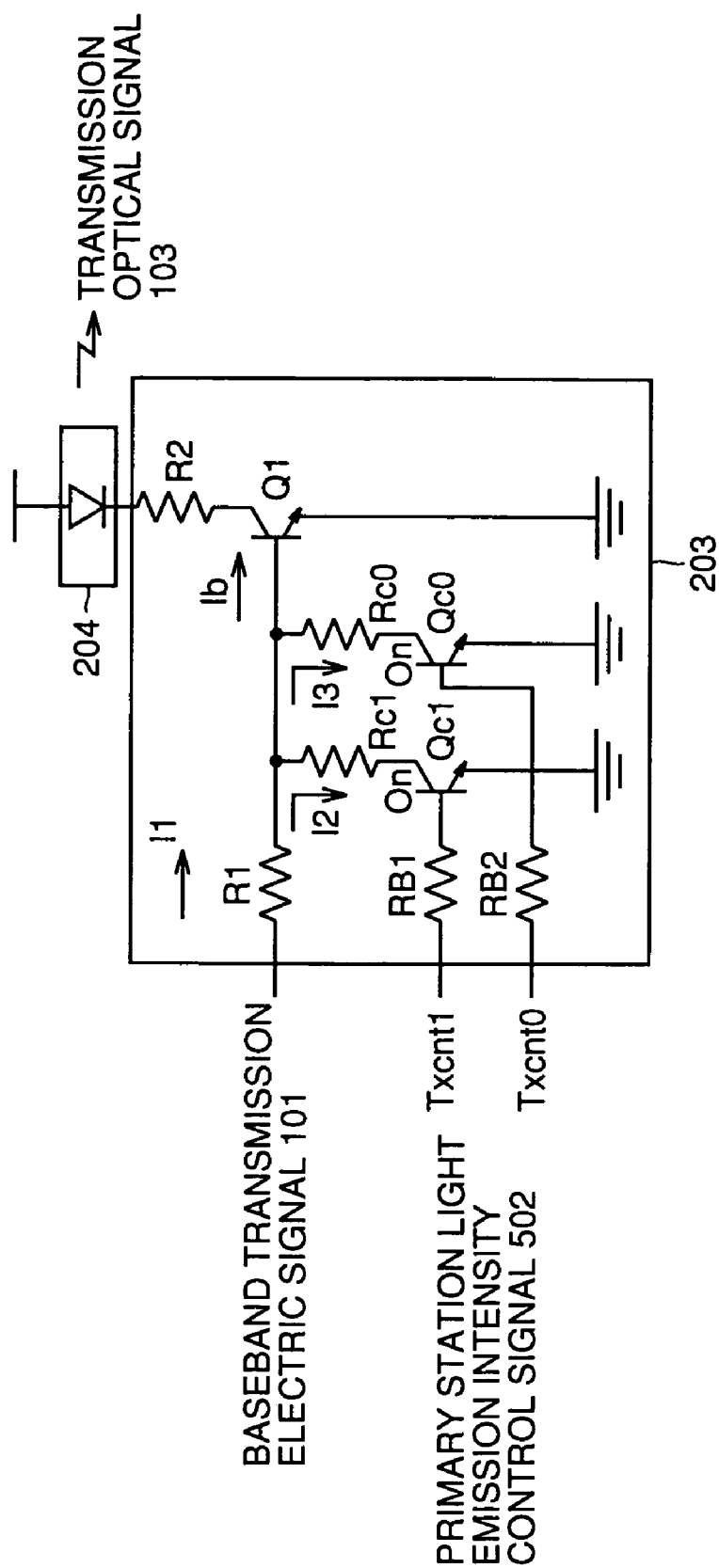
FIG. 14 illustrates an operation of the drive circuit 203.

Primary station light emission intensity control signal (Txcnt1, Txcnt0) 502 causes transistors Qc0 and Qc1 to be turned on/off, and the current flowing through light emitting device 204 is controlled when baseband transmission electric signal 101 is at H level. For example, if the intensity level of the received light is the maximum, namely primary station light emission intensity control signal 502 is (Txcnt1, Txcnt0)=(1, 1), transistors Qc1 and Qc0 are both turned on to cause electric current to flow through resistor elements Rc1 and Rc0 as shown in FIG. 14. As a result, the base current of transistor Q1 decreases and thus the current flowing through light emitting device 204 decreases. This status can be represented by the following expression. In the expression, the base current of transistor Q1 is represented by Ib, the current flowing through resistor element R1 is represented by I1, the collector current of transistor Qc1 is represented by I2, and the collector current of transistor Qc0 is represented by I3.

$$Ib=I1-(I2+I3) \quad (3)$$

When the intensity level of the received light is the minimum, namely primary station light emission intensity control signal 502 is (Txcnt1, Txcnt0)=(0, 0), transistors Qc1 and Qc0 are both turned off, so that no current flows through resistor elements Rc1 and Rc0. As a result, the base current of transistor Q1 has the maximum value (I1) and thus the current flowing through light emitting device 204 increases.

When the intensity level of the received light has the intermediate value, only one of transistors Qc1 and Qc0 is turned on, the base current of transistor Q1 is thus represented by (I1–I2) or (I1–I3), so that the current flowing through light emitting device 204 is controlled between I1 and (I1–I2–I3).

Figure 15:
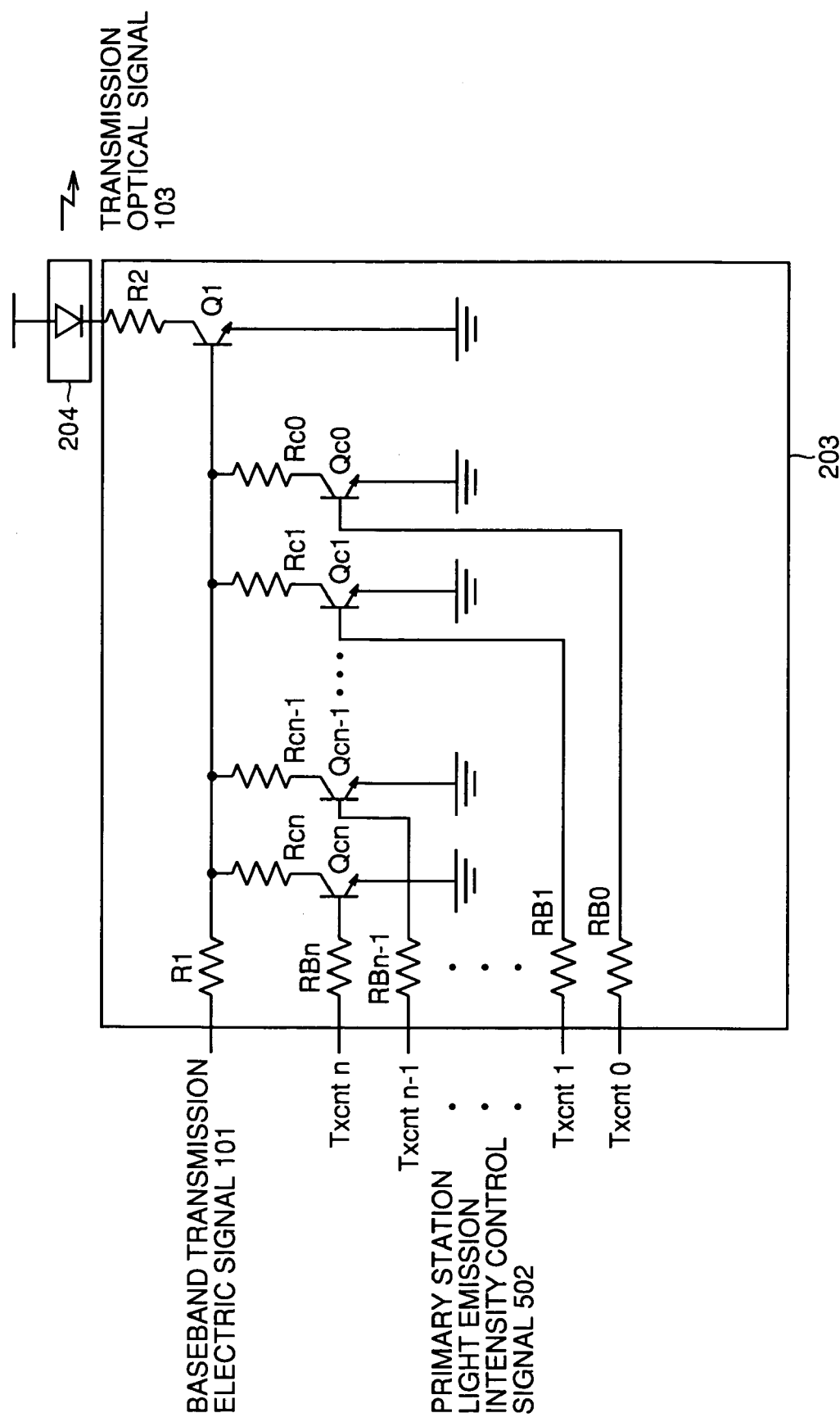
FIG. 15 shows another circuit structure of the drive circuit 203.

In the description of the circuit structure above, reception light intensity level judgment circuit 600 outputs 2-bit reception light intensity level judgement signal 500 and primary station light emission intensity control signal generation circuit 601 outputs 2-bit primary station light emission intensity control signal 502. However, respective circuits may generate signals of 3-bit or more to achieve a further detailed setting of the light emission intensity of light emitting device 204. For example, the primary station light emission intensity control signal has n+1 bits (Txcnt0–Txcntn) as shown in FIG. 15. N+1 resistor elements Rc0–Rcn are connected in parallel between transmission electric signal 101 and transistor Q1, and the collector terminals of transistors Qc0–Qcn are connected to the other terminals of resistor elements Rc0–Rcn. The base terminals of respective transistors Qc0–Qcn are connected to Txcnt0–Txcntn signals via resistor elements RB0–RBn. Further, emitter terminals of respective transistors Qc0–Qcn are connected to the ground. Such a circuit structure achieves a still further detailed setting of the light emission intensity of light emitting device 204.

Reception light intensity level judgment circuit 600 may be placed within optical reception circuit 400 instead of the outside of optical reception circuit 400. The optical communication device of this embodiment is applied only to the optical communication device of the first station. However, the optical communication device of this embodiment may be applied to the optical communication device of the second station.

As heretofore described, in the optical communication device of this embodiment, drive circuit 203 controls the light emission intensity of light emitting device 204 based on the intensity level of the received light judged by reception light intensity level judgement circuit 600. Consequently, reduction of power consumption of the optical communication device is achieved. Further, drive circuit 203 decreases the light emission intensity of light emitting device 204 only when decoding circuit 402 normally completes the reception process, so that reduction of the communication quality (code error rate) can be avoided.

Second Embodiment

An optical communication device of the second embodiment of the invention is implemented as a set of optical communication devices with one optical communication device (hereinafter referred to as first station) adjusting the light emission intensity and the other optical communication device (referred to as second station) making no adjustment of the light emission intensity, namely the optical communication devices of the first and second stations. For example, the optical communication device of the first station is a battery-driven optical communication device, while the optical communication device of the second station is an AC connected optical communication device. Optical communication between the optical communication device of the first station and the optical communication device of the second station is made according to the ASK system.

Figure 16:
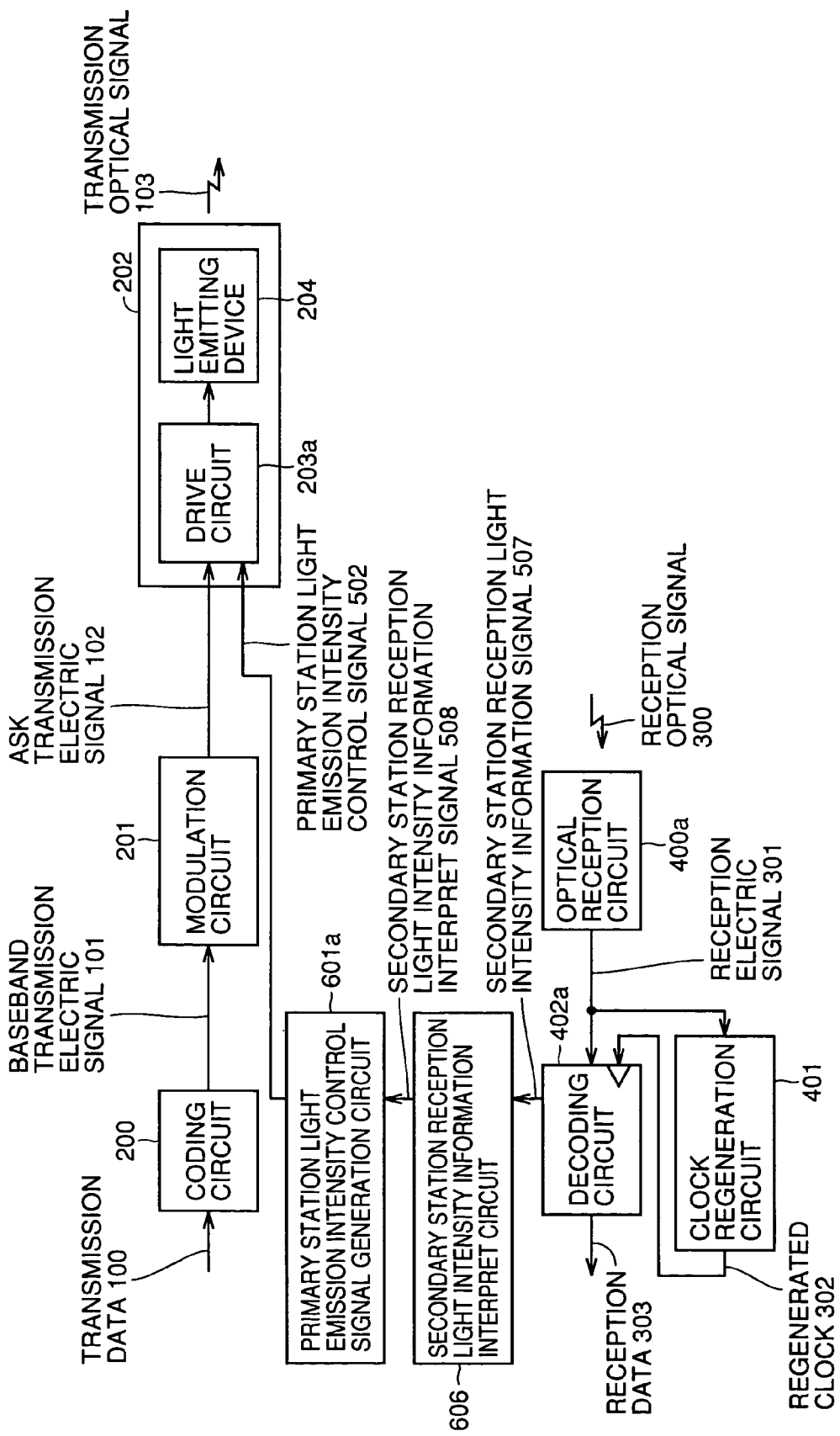
FIG. 16 is a schematic block diagram illustrating a structure of an optical communication device of a first station according to the second embodiment of the invention.

FIG. 16 is a schematic block diagram illustrating a structure of the optical communication device of the first station in the second embodiment of the invention. The optical communication device of the first station includes a coding circuit 200 coding a transmission data 100, a modulation circuit 201 ASK modulating a base band transmission electric signal 101 supplied from coding circuit 200 and outputting the modulated one, an optical transmission circuit 202 converting an ASK transmission electric signal 102 supplied from modulation circuit 201 to an optical signal (transmission optical signal 103) and outputting the optical signal to any externally unit, an optical reception circuit 400a converting a reception optical signal 300 which is received from any external source to an electric signal (reception electric signal 301) and outputting the converted one, a clock regeneration circuit 401 extracting a clock signal from reception electric signal 301 supplied from optical reception circuit 400a and outputting the clock signal, a decoding circuit 402a decoding a reception data based on reception electric signal 301 supplied from optical reception circuit 400a and on the clock signal supplied from clock regeneration circuit 401, extracting reception light intensity information of a secondary station and outputting the extracted one, a secondary station reception light intensity information interpret circuit 606 inputting a secondary station reception light intensity information signal 507 supplied from decoding circuit 402a and interpreting it, and a primary station light emission intensity control signal generation circuit 601a controlling the light emission intensity of optical transmission circuit 202 based on a secondary station reception light intensity information interpret signal 508 supplied from secondary station reception light intensity information interpret circuit 606.

Optical transmission circuit 202 includes a light emitting device 204, and a drive circuit 203a adjusting the light emission intensity based on primary station light emission intensity control signal 502 supplied from primary station light emission intensity control signal generation circuit 601a and causing light emitting device 204 to convert ASK transmission electric signal 102 outputted from modulation circuit 201 to an optical signal. It is noted that optical reception circuit 400a has the same structure and function as those of the conventional optical reception circuit 930 shown in FIG. 5 and detailed description thereof is not repeated here.

Figure 17:
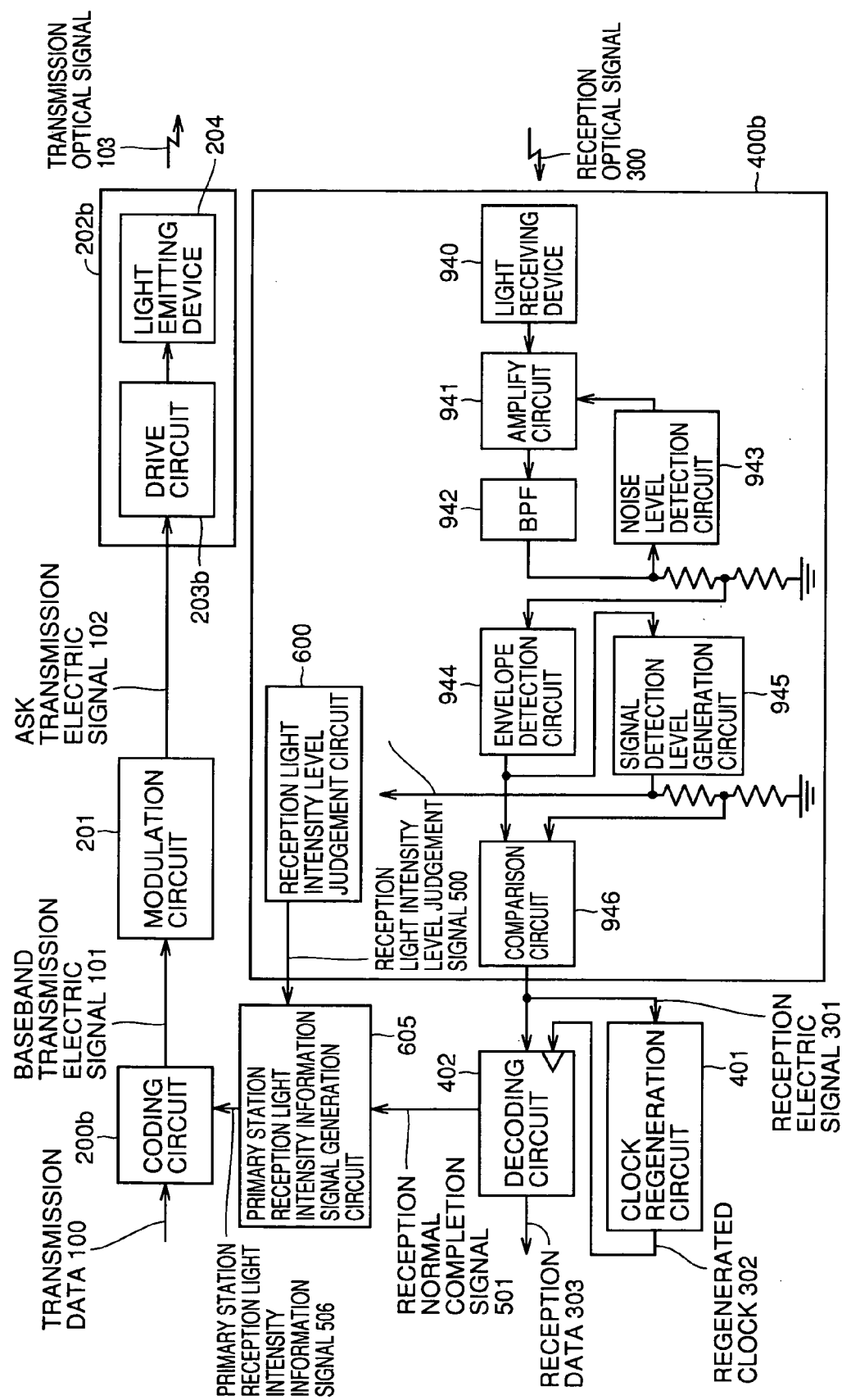
FIG. 17 is a schematic block diagram showing a structure of an optical communication device of a second station according to the second embodiment of the invention.

FIG. 17 is a schematic block diagram illustrating a structure of the optical communication device of the second station in the second embodiment of the invention. The optical communication device of the second station includes a coding circuit 200b coding a transmission data 100 and reception light intensity information of a primary station, a modulation circuit 201 ASK modulating a baseband transmission electric signal 101 supplied from coding circuit 200b and outputting the modulated one, an optical transmission circuit 202b converting an ASK transmission electric signal 102 supplied from modulation circuit 201 to an optical signal (transmission optical signal 103) and outputting the converted one, an optical reception circuit 400b converting a reception optical signal 300 received from any external source to an electric signal (reception electric signal 301) and outputting the converted one, a clock regeneration circuit 401 extracting a clock signal from reception electric signal 301 supplied from optical reception circuit 400b and outputting the extracted signal, a decoding circuit 402 decoding reception data based on reception electric signal 301 supplied from optical reception circuit 400b and the clock signal supplied from clock regeneration circuit 401, and outputting a reception normal completion signal 501 indicating that the data reception process is normally completed, and a primary station reception light intensity information signal generation circuit 605 generating a primary station reception light intensity information signal 506 based on reception normal completion signal 501 supplied from decoding circuit 402 and on reception light intensity level judgement signal 500 supplied from optical reception circuit 400b and outputting the generated signal to coding circuit 200b.

Figure 5:
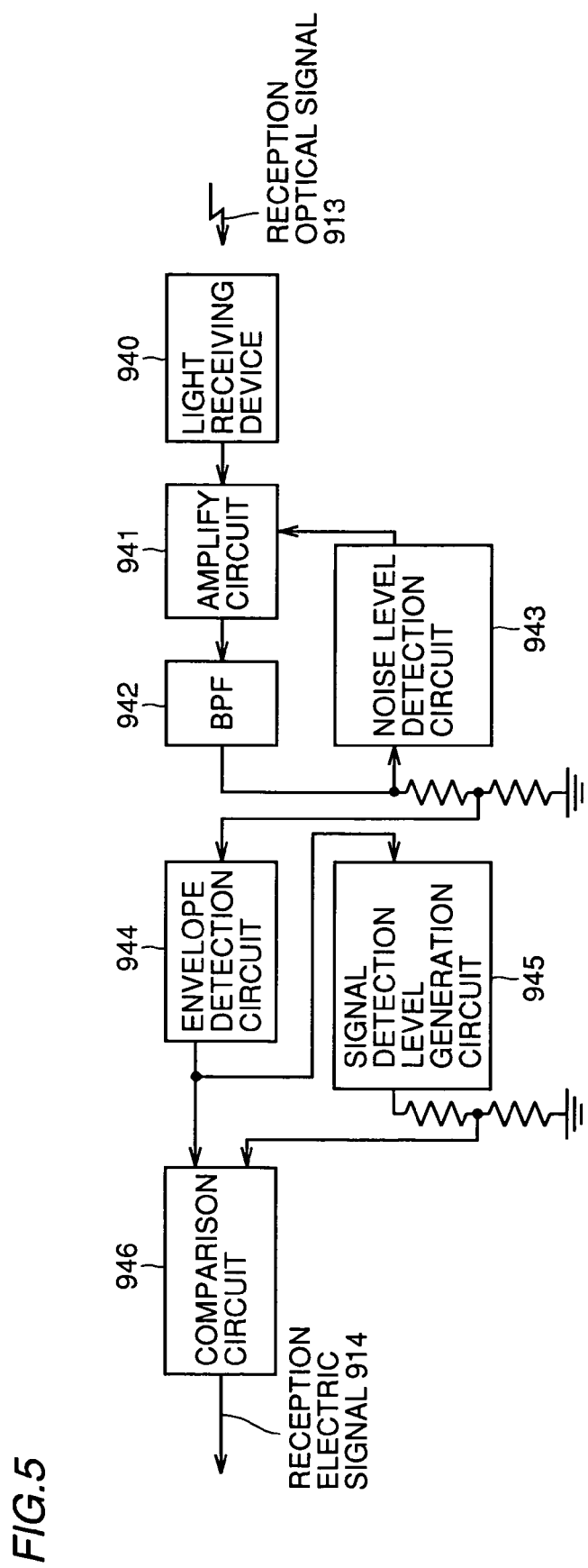
FIG. 5 is a schematic block diagram illustrating a structure of a conventional ASK optical reception circuit 930.

Optical reception circuit 400b is different from the conventional optical reception circuit 930 shown in FIG. 5 only in that the former additionally has a reception light intensity level judgement circuit 600 which inputs signal detection level generation circuit output signal 504 supplied from a signal detection level generation circuit 945 to judge the light intensity level of the received light. Detailed description of the identical structures and functions is not repeated here. Primary station reception light intensity information generation circuit 605 may be implemented by the same circuit structure as that of primary station light emission intensity control signal generation circuit 601 shown in FIG. 6.

Figure 1:
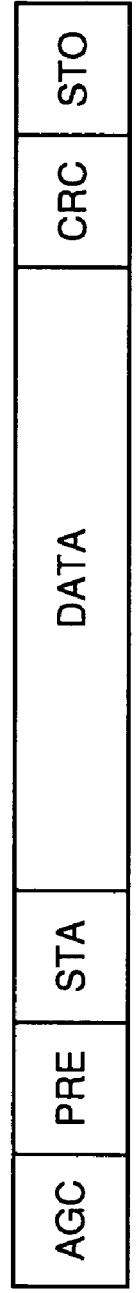
FIG. 1 illustrates a format of a packet which is used in a conventional optical communication.
Figures 3A, 3B:
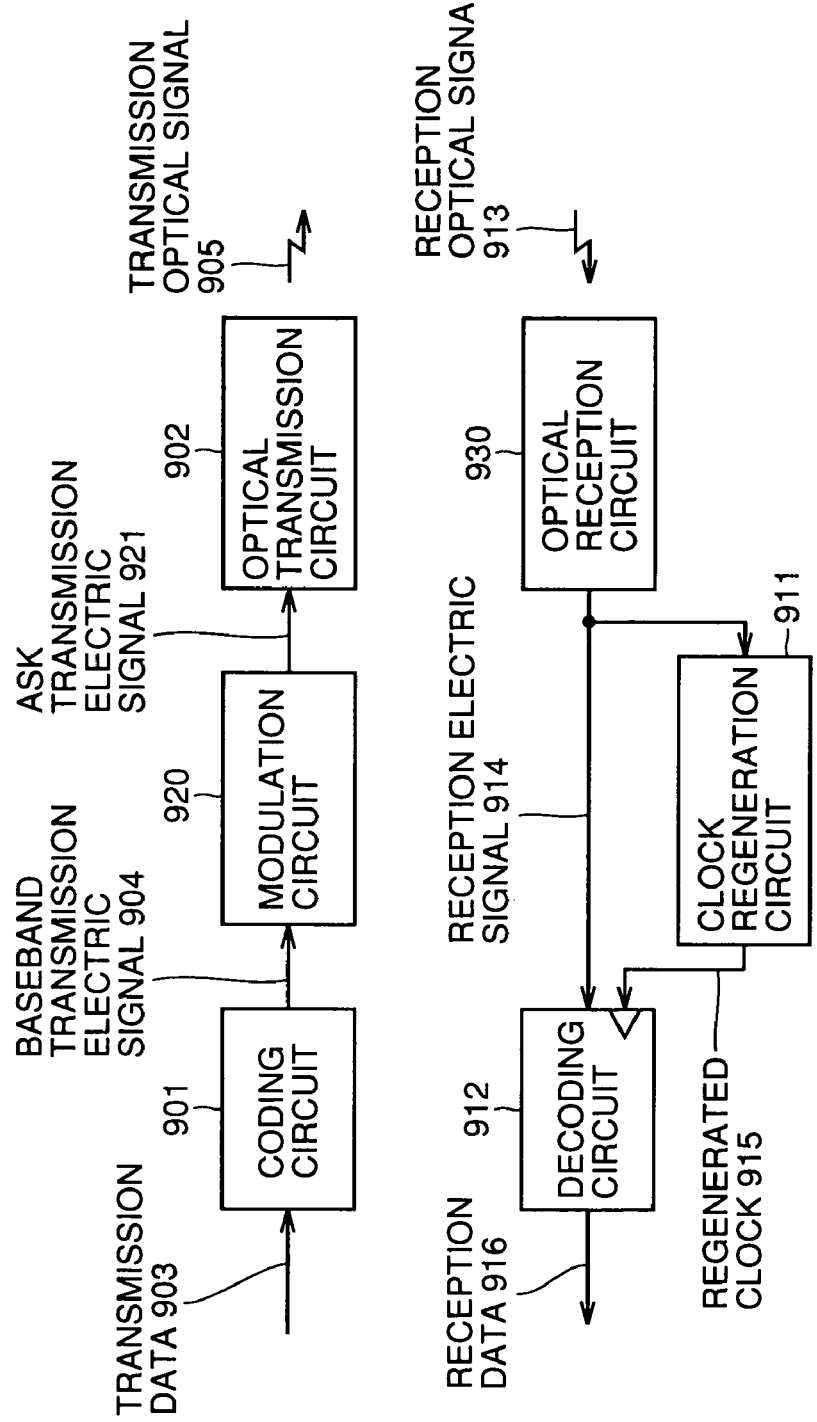
FIGS. 3A and 3B are schematic block diagrams respectively illustrating a transmitter section and a receiver section in a conventional ASK optical communication device.
Figure 4:
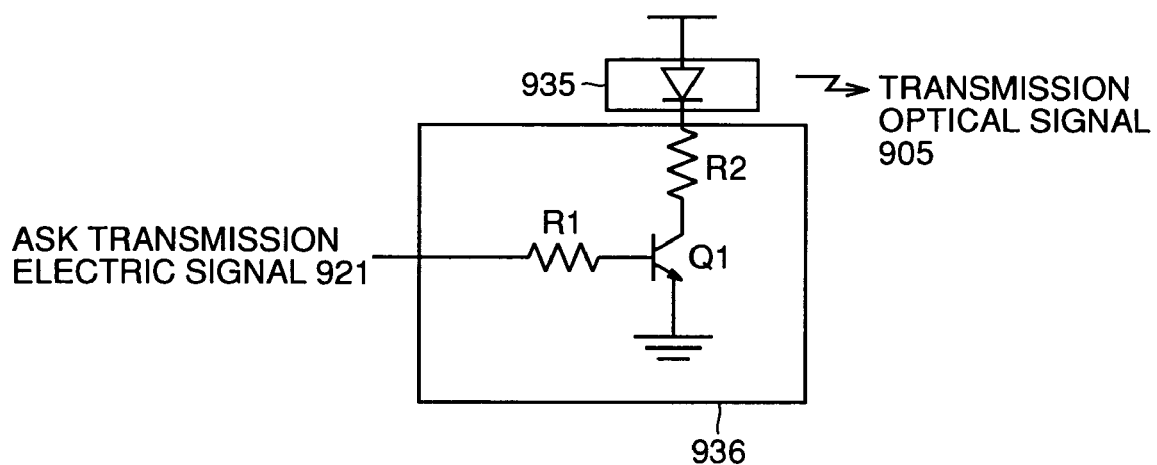
FIG. 4 illustrates a circuit structure of an optical transmission circuit 902 in the conventional ASK optical communication device.

Reception light intensity level judgement circuit 600 judges the reception light intensity level based on the signal detection level generation circuit output signal 504 supplied from signal detection level generation circuit 945. Although reception light intensity level judgement circuit 600 can judge the reception light intensity level based on the signal supplied from another circuit (amplify circuit 941, bandpass filter 942, envelope detection circuit 944, or the like), judgement circuit 600 uses an output signal from signal detection level generation circuit 945 which outputs a signal closest to that of comparison circuit 946. The reason is that the signal supplied from amplify circuit 941 or the like contains background light noises or the like and accordingly the reception light intensity level of only the reception optical signal cannot be judged. Drive circuit 203b has the same structure and function as those of the conventional drive circuit 936 shown in FIG. 4, and detailed description thereof is not repeated here.

Figure 18:
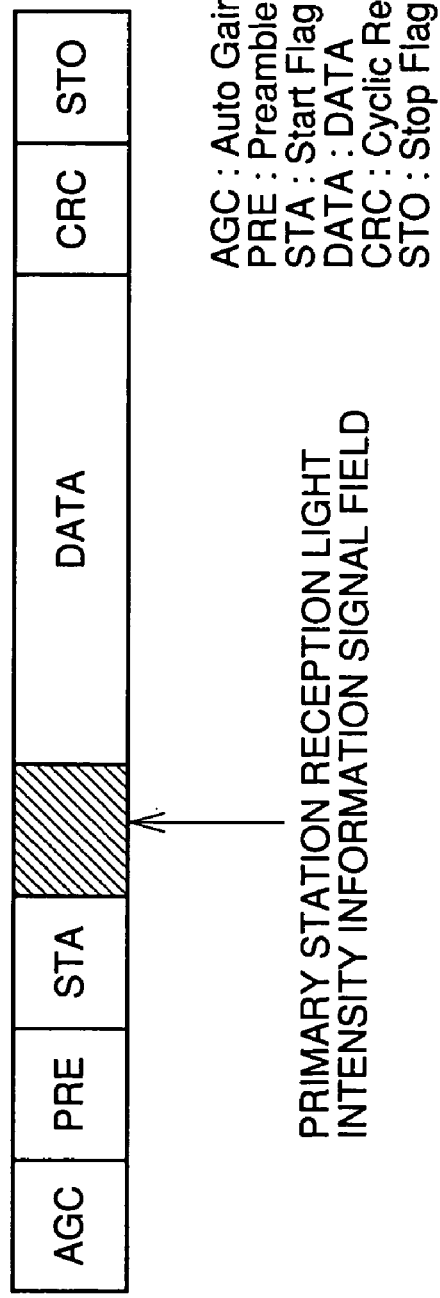
FIG. 18 illustrates in detail a packet transmitted by the optical communication device according to the second embodiment of the invention.

In the optical communication device of the second station shown in FIG. 17, coding circuit 200b generates a packet including primary station reception light intensity information signal 506 generated by primary station reception light intensity information signal generation circuit 605 and encodes it. FIG. 18 shows one example of the packet generated by coding circuit 200b. As shown in FIG. 18, the primary station reception light intensity information signal is stored to follow a start flag (STA) field. The primary station reception light intensity information may be stored in another field within the packet. A packet including only the primary station reception light intensity information may be generated to be transmitted to the optical communication device of the first station.

In the optical communication device of the first station shown in FIG. 16, decoding circuit 402a extracts, when it decodes reception electric signal 301 received by optical reception circuit 400a, secondary station reception light intensity information signal 507 contained in the packet (primary station reception light intensity information signal 506 in the optical communication device of the second station). Secondary station reception light intensity information interpret circuit 606 inputs secondary station reception light intensity information signal 507 supplied from decoding circuit 402, judges the reception light intensity in the optical communication device of the second station and outputs secondary station reception light intensity information interpret signal 508. Primary station light emission intensity control signal generation circuit 6011a outputs primary station light emission intensity control signal 502 to drive circuit 203 based on secondary station reception light intensity information interpret signal 508 to control the light emission intensity of light emitting device 4.

Figures 19, 20:
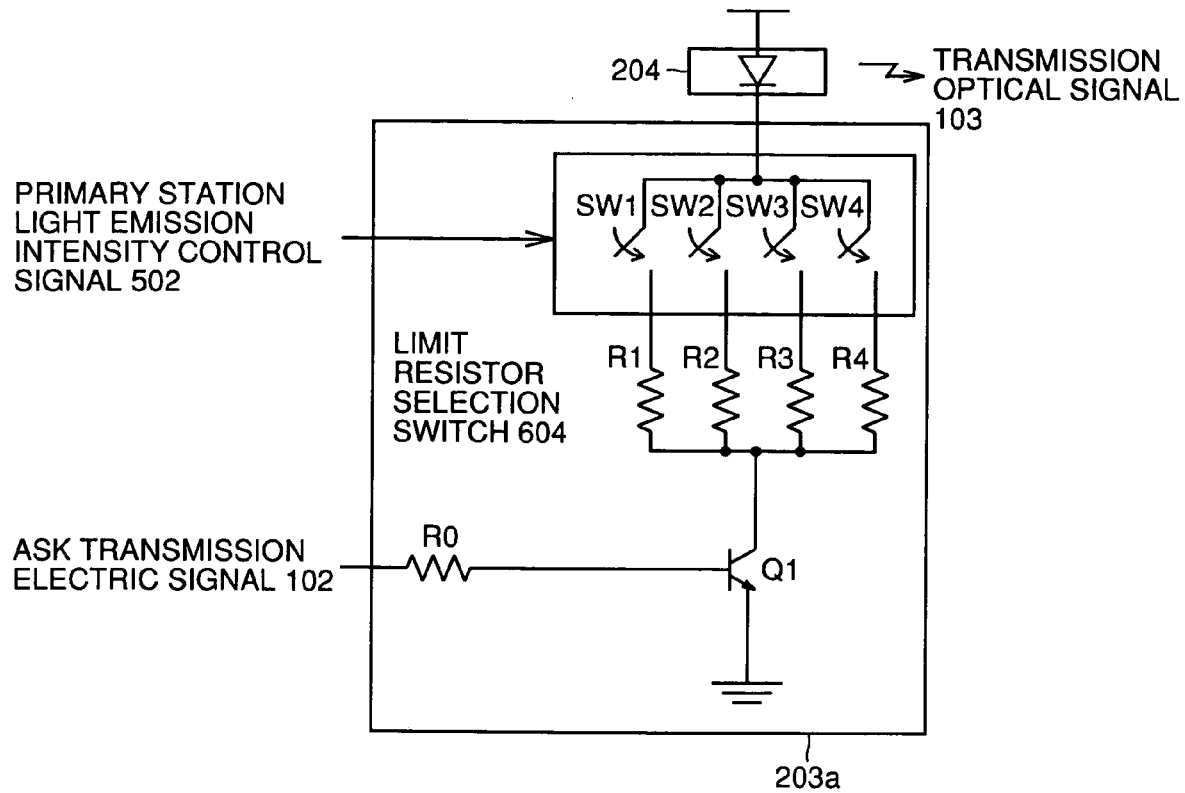

FIG. 19 illustrates one example of the circuit structure of drive circuit 203a in the optical communication device of the first station shown in FIG. 16. Drive circuit 203a includes a transistor Q1 having its emitter terminal connected to the ground, a resistor element R0 connected in series between ASK transmission electric signal 102 and the base terminal of transistor Q1, limit resistor elements R1–R4 connected in parallel to the collector terminal of transistor Q1, and a limit resistor selection switch 604 connected between light emitting device 204 and limit resistor elements R1–R4.

Limit resistor selection switch 604 turns on any of SW1–SW4 based on primary station light emission intensity control signal 502 (Txcnt1, Txcnt0). Current I flowing through light emitting device 204 can be represented by the following expression where a limit resistor element connected to any of switches SW1–SW4 which is turned on is Rn (Rn=R1, R2, R3, R4, R1<R2<R3<R4), supply voltage is Vcc, voltage drop by light emitting device 204 is Vf, and saturation voltage of transistor Q1 is Vsat.

$$I=(Vcc-Vf-Vsat)/Rn \qquad (4)$$

FIG. 20 illustrates a relation between the primary station light emission intensity control signal (Txcnt1, Txcnt0) and the states of limit resistor selection switch 604. For example, in the case of (Txcnt1, Txcnt0)=(0, 0), switch SW1 is turned on to cause current to flow through limit resistor R1. Since limit resistor R1 has the lowest resistance value, the maximum current flows through light emitting device 204 and thus the light emission intensity is the highest one. In the case of (Txcnt1, Txcnt0)=(1, 1), switch SW4 is turned on and the electric current flows through limit resistor R4. Since limit resistor R4 has the highest resistor value, the minimum current flows through light emitting device 204 and thus the light emission intensity is the lowest one.

Primary station reception light intensity information signal generation circuit 605 in the optical communication device of the second station shown in FIG. 17 outputs primary station reception light intensity information signal 506 to report the reception light intensity level to the secondary station when reception is normally completed. However, reception light intensity level judgement signal 500 and reception normal completion signal 501 may be separately reported to the secondary station (optical communication device of the first station). The optical communication device of the first station can make a total judgement based on the supplied reception light intensity level judgement signal 500 and reception normal completion signal 501 to determine the light emission intensity. For example, the optical communication device of the first station may not make a control to decrease the light emission intensity when reception normal completion signal 501 is inactive even if it is determined that the light reception intensity of the optical communication device of the second station is higher based on reception intensity level judgement signal 500. The optical communication device of the first station may control the light emission intensity by recognizing that the reception intensity level judgement signal 500 has a value smaller than the actual one when reception normal completion signal 501 is inactive.

In general, it is impossible to perfectly prevent generation of errors in the optical communication, and thus errors may occur even if the reception light intensity is sufficient. Therefore, even if any error occurs and decoding of the received signal is not normally completed, it is not preferable to immediately make a control for increasing the light emission intensity. Preferably, the light emission intensity is controlled after observing occurrence of any error during a certain time.

If the communication distance is too short, amplify circuit 941 in optical reception circuit 400b may saturate to cause errors due to too large a reception light intensity.

In the optical communication device of this embodiment, primary station reception light intensity information signal 506 (primary station light emission intensity control signal 502) is a 2-bit signal for the purpose of description. However, the light emission intensity may be controlled using a signal of 3 bits or more.

As heretofore described, in the optical communication device of this embodiment, the optical communication device of the second station judges the reception light intensity level and transmits its result to the optical communication device of the first station. The optical communication device of the first station then controls the light emission intensity based on the reception light intensity level of the optical communication device of the second station. Consequently, the light emission intensity can appropriately be controlled. Further, the optical communication device of the second station judges the reception light intensity level considering the fact of whether or not the receiving operation is normally completed. Accordingly, the optical communication device of the first station can further appropriately control the light emission intensity.

Third Embodiment

In the third embodiment of the invention, both of the optical communication devices making a bidirectional optical communication adjust the light emission intensity. For example, both of the optical communication devices are battery-driven ones. The optical communication between the optical communication device of the first station and the optical communication device of the second station follows the ASK system.

Figure 21:
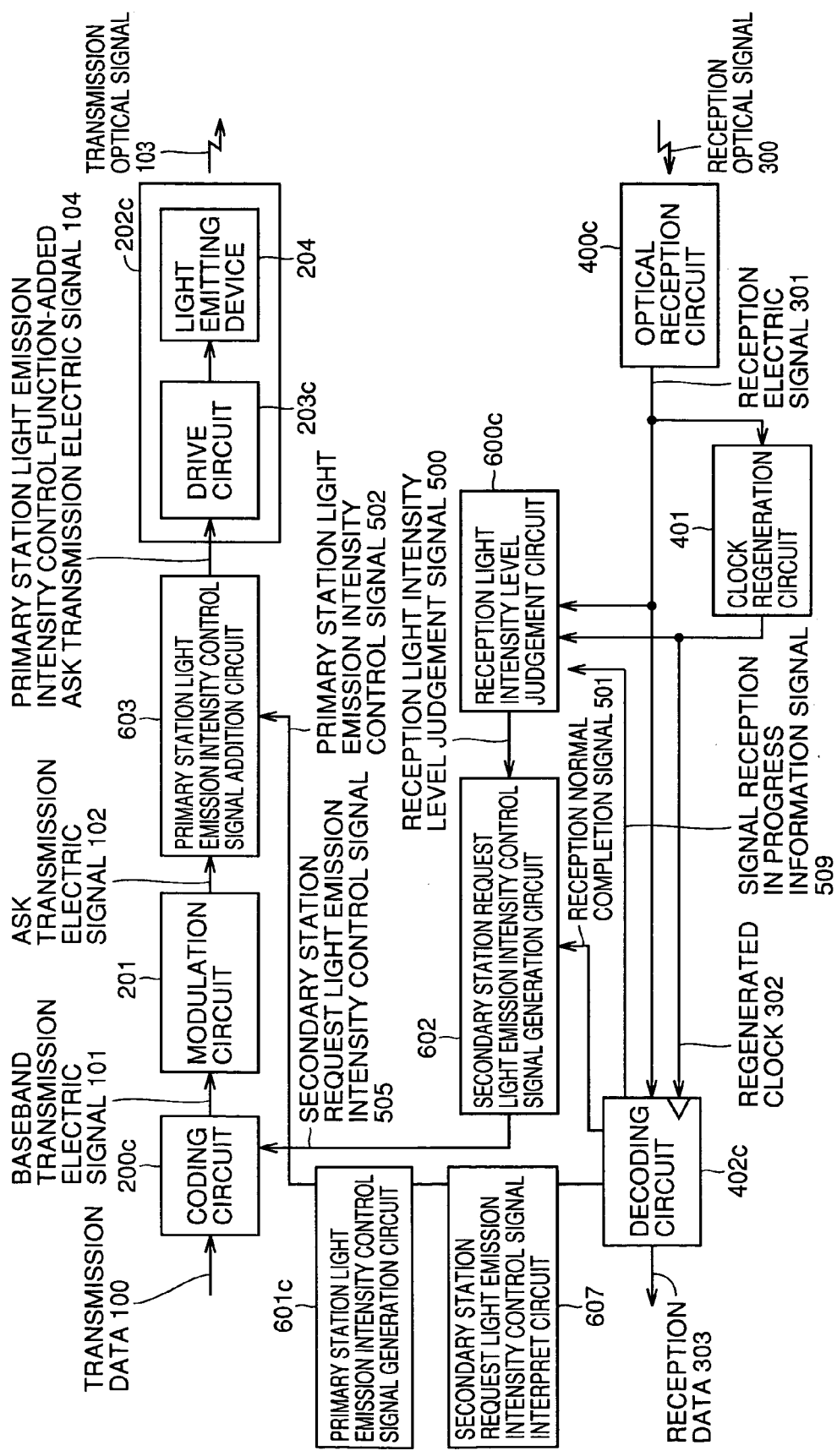
FIG. 21 is a schematic block diagram showing a structure of an optical communication device according to the third embodiment of the invention.

FIG. 21 is a schematic block diagram showing a structure of the optical communication devices of the first and second stations. The optical communication device includes a coding circuit 200c coding a transmission data 100 and a secondary station request light emission intensity control signal 505, a modulation circuit 201 ASK modulating a baseband transmission electric signal 101 supplied from coding circuit 200c and outputting the modulated one, a primary station light emission intensity control signal addition circuit 603 adding a primary station light emission intensity control signal 502 to an ASK transmission electric signal 102 supplied from modulation circuit 201 and outputting a resultant one, an optical transmission circuit 202c converting the electric signal to an optical signal (transmission optical signal 103) based on primary station light emission intensity control function-added ASK transmission electric signal 104 supplied from primary station light emission intensity control signal addition circuit 603 and outputting the optical signal, an optical reception circuit 400c converting a reception optical signal 300 which is received from any external source to an electric signal (reception electric signal 301) and outputting the electric signal, a clock regeneration circuit 401 extracting a clock signal from reception electric signal 301 supplied from optical reception circuit 400c and outputting the clock signal, a decoding circuit 402c decoding reception data based on reception electric signal 301 supplied from optical reception circuit 400c and the clock signal supplied from clock regeneration circuit 401, extracting a secondary station request light emission intensity control signal supplied from the secondary station and outputting the extracted one, and outputting a reception normal completion signal 501 indicating whether or not reception is normally completed and a signal reception in progress information signal indicating that reception of signal from the secondary station is in progress, a reception light intensity level judgement circuit 600c judging the reception light intensity level based on signal reception in progress information signal 509 supplied from decoding circuit 402c, reception electric signal 301 supplied from optical reception circuit 400c, and regenerated clock signal 302 supplied from clock regeneration circuit 401, a secondary station request light emission intensity control signal generation circuit 602 outputting a secondary station request light emission intensity control signal 505 based on reception light intensity level judgement signal 500 supplied from reception light intensity level judgement circuit 600c and on reception normal completion signal 501 supplied from decoding circuit 402c, a secondary station request light emission intensity control signal interpret circuit 607 interpreting a secondary station request light emission intensity control signal from the secondary station which is extracted by decoding circuit 402c, and a primary station light emission intensity control signal generation circuit 601c generating a primary station light emission intensity control signal 502 based on the result of interpretation by secondary station request light emission intensity control signal interpret circuit 607.

When decoding circuit 402c decodes reception electric signal 301, it renders signal reception in progress information signal 509 active when the start flag of the packet is detected, and renders signal reception in progress information signal 509 inactive when the stop flag is detected. Reception light intensity level judgement circuit 600c make judgement of the reception light level when signal reception in progress information signal 509 is active.

Generally, in the optical communication, when the intensity level of the received light signal is high, the pulse width is large and jitter is small. When the intensity level of the received light signal is low, the pulse width is small and the jitter is large. Therefore, the intensity level of the received light signal can be judged based on variation in the pulse width and jitter of reception electric signal 301 supplied from optical reception circuit 400c. When the communication distance is long, the reception light intensity is small and thus the error rate is high, and the error rate could be an index of the reception light intensity information in a large sense.

Figure 22:
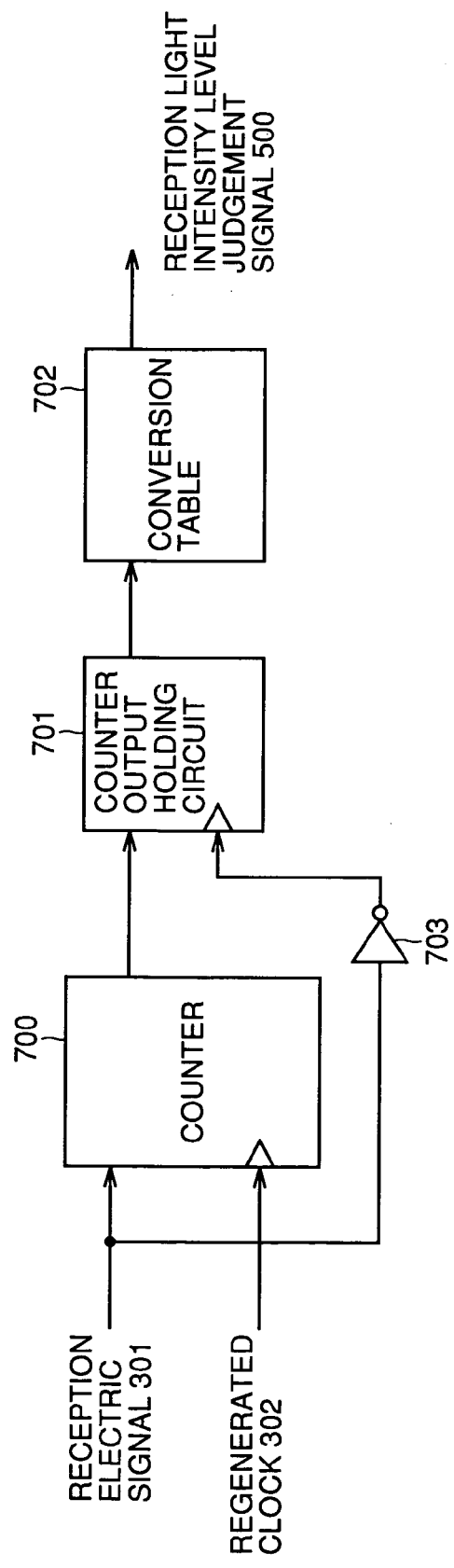
FIG. 22 shows a circuit structure of a reception light intensity level judgment circuit 600c.

FIG. 22 is a schematic block diagram showing a structure of reception light intensity level judgement circuit 600c. Reception light intensity level judgement circuit 600c includes a counter 700 counting the pulse width of reception electric signal 301, a counter output holding circuit 701 holding the count value obtained by counter 700, a conversion table 702 converting the count value held by counter output holding circuit 701 to reception light intensity level judgement signal 500, and an inverter inverting reception electric signal 301 for inputting it to the clock terminal of counter output holding circuit 701. Regenerated clock 302 is herein corresponds to a clock 20 times larger than the pulse width of reception electric signal 301.

Counter 700 counts the pulse width of reception electric signal 301 by regenerated clock 302. At the falling edge of reception electric signal 301, the count value of counter 700 is held by counter output holding circuit 701. When the reception light intensity level is sufficiently high, counter 700 counts up to 20. Depending on design of a photoelectric conversion circuit, the pulse width in reception may be greater than the pulse width in transmission and the count value of the counter 700 could exceed 20. If the reception light intensity level is low, counter 700 does not count up to 20.

Conversion table 702 judges the reception light intensity level based on the count value held by count output holding circuit 701 and outputs the result to secondary station request light emission intensity control signal generation circuit 602.

Figures 23, 24:
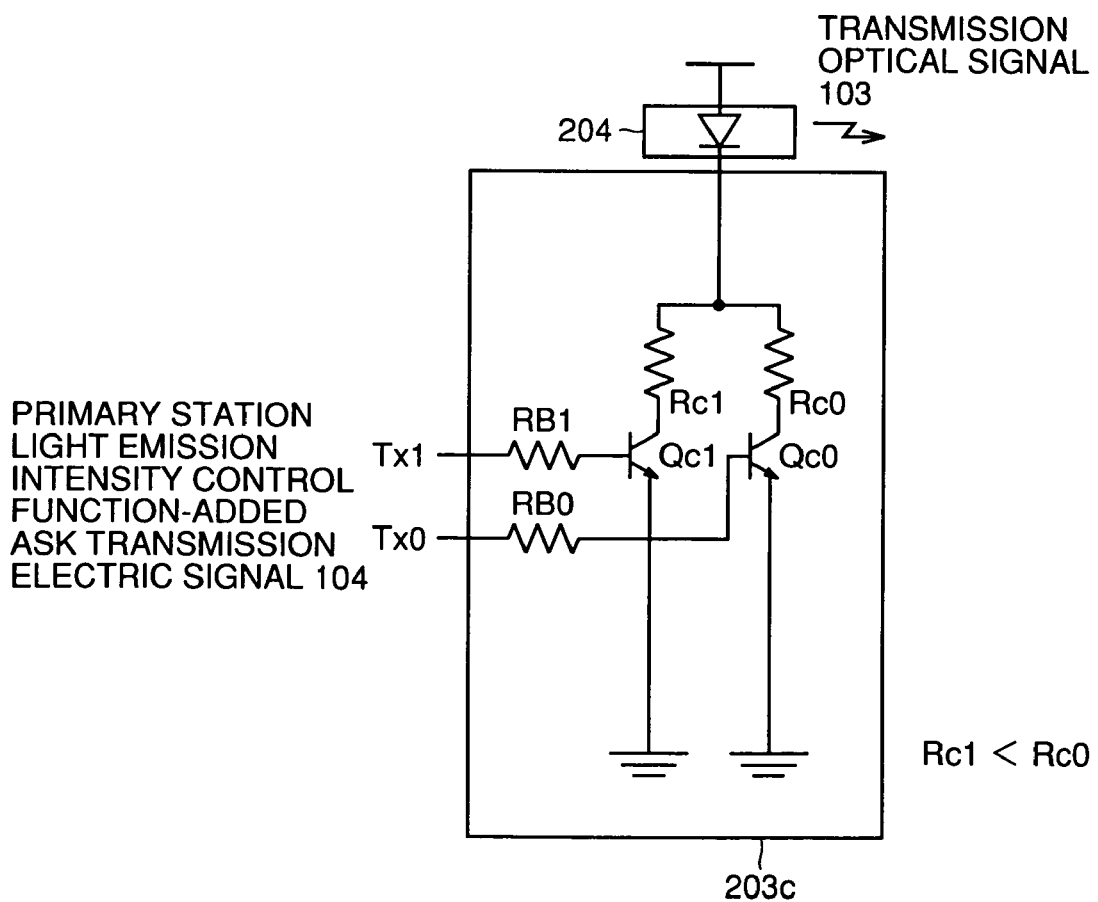
FIG. 23 illustrates contents of a conversion table 702.
FIG. 24 shows a circuit structure of a drive circuit 203c.

FIG. 23 illustrates the contents of conversion table 702. When the count value held by counter output holding circuit 701 is 20 or more, conversion table 702 outputs (1, 1) to reception light intensity level judgement signal (Rxlevel1, Rxlevel0). When the count value held by counter output holding circuit 701 ranges from 16 to 19, conversion table 702 outputs (1, 0) to the reception light intensity level judgement signal (Rxlevel1, Rxlevel0). When the count value held by counter output holding circuit 701 is 15 or less, conversion table 702 outputs (0, 1) to the reception light intensity level judgement signal (Rxlevel1, Rxlevel0). Reception light intensity level judgement circuit 600c operates only when signal reception in progress information signal 509 is active.

Secondary station request light emission intensity control signal generation circuit 602 refers to reception light intensity level judgement signal 500 to output secondary station request light emission intensity control signal 505 for providing an appropriate light emission intensity of the secondary station, when it is judged that the receiving operation is normally completed by reception normal completion signal 501 supplied from decoding circuit 402c.

Primary station light emission intensity control signal addition circuit 603 can be implemented by a simple logical circuit. Primary station light emission intensity control function-added ASK transmission electric signal 104 is formed of a logical circuit represented by the following expressions, where ASK transmission electric signal 102 supplied from modulation circuit 201 is represented by Task, and Txcnt1=Rxlevel1, Txcnt0=Rxlevel0. In the expressions below, "·" represents a logical product.

$$Tx1 = Txcnt1 \cdot Task \quad (5)$$

$$Tx0 = Txcnt0 \cdot Task \quad (6)$$

FIG. 24 illustrates a circuit structure of drive circuit 203c. Drive circuit 203c includes transistors Qc0 and Qc1 having emitter terminals connected to the ground, a resistor element RB0 connected in series between secondary station light emission intensity control function-added ASK transmission electric signal Tx0 and the base terminal of transistor Qc0, a resistor element RB1 connected in series between primary station light emission intensity control function-added ASK transmission electric signal Tx1 and the base terminal of transistor Qc1, a resistor element Rc0 connected in series between light emitting device 204 and the collector terminal of transistor Qc0, and resistor element Rc1 connected in series between light emitting device 204 and the collector terminal of transistor Qc1.

Current I flowing through light emitting device 204 can be represented by the following expression where supply voltage is Vcc, voltage drop of light emitting device 204 is Vf, saturation voltage of transistors Qc0 and Qc1 is Vsat.

$$I = (Vcc - Vf - Vsat)/Rc1 + (Vcc - Vf - Vsat)/Rc0 \quad (7)$$

When primary station light emission intensity control function-added ASK transmission electric signal (Tx1, Tx0) is (1, 1), both of the transistors Qc1 and Qc0 are turned on and the maximum current flows through light emitting device 204 and accordingly the light emission intensity has the maximum value. When primary station light emission intensity control function-added ASK transmission electric signal (Tx1, TX0) is (1, 0) or (0, 1), only one of transistors Qc1 and Qc0 is turned on so that the light emission intensity of light emitting device 204 is smaller than its maximum value.

Figure 25:
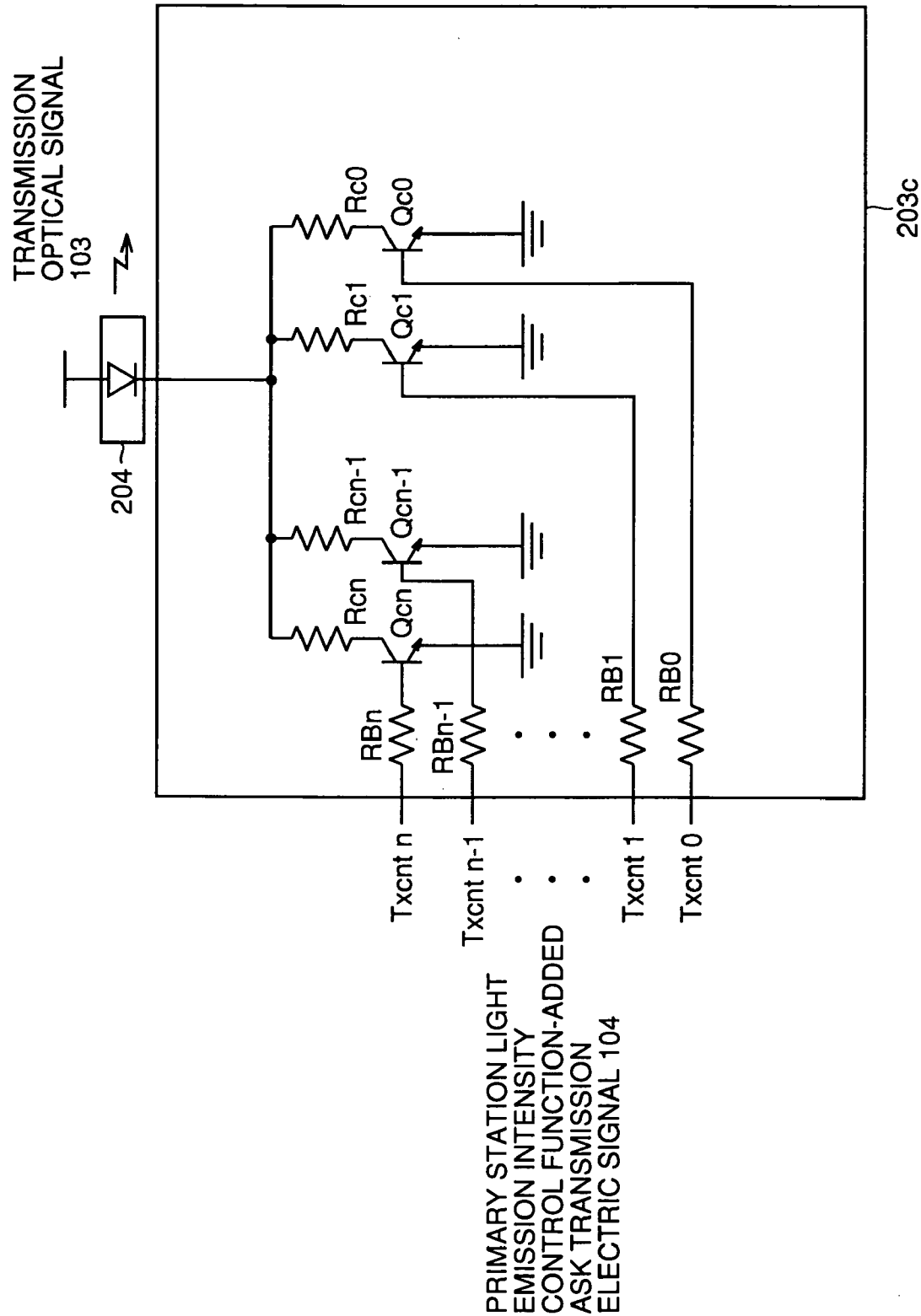
FIG. 25 shows another circuit structure of the drive circuit 203c.

In the description above, although primary station light emission intensity control signal adding circuit 603 has a circuit structure to output 2-bit primary station light emission intensity control function-added ASK transmission electric signal 104, primary station light emission intensity control function-added ASK transmission electric signal 104 of 3-bit or more may be generated to achieve more detailed setting of the light emission intensity of light emitting device 204. For example, as shown in FIG. 25, primary station light emission intensity control function-added ASK transmission electric signal has n+1 bits (Txcnt0–Txcnt n). N+1 resistor elements Rc0–Rcn are connected in parallel to light emitting device 204, and the collector terminals of transistors Qc0–Qcn are connected to the other terminals of respective resistor elements Rc0–Rcn. The base terminals of respective transistors Qc0–Qcn are connected to Txcnt0–Txcnt n signals via resistor elements RB0–RBn. The emitter terminals of respective transistors Qc0–Qcn are connected to the ground. In such a circuit structure, more detailed setting of the light emission intensity of light emitting device 204 is possible.

As heretofore described, in the optical communication device of this embodiment, a required light emission intensity is requested to the secondary station based on reception light intensity level judgement signal 500 and reception normal completion signal 501, so that the optical communication device of the secondary station can make an appropriate adjustment only by adjusting the light emission intensity following the request.

Fourth Embodiment

In the fourth embodiment of the invention, both of the optical communication devices making a bidirectional optical communication adjust the light emission intensity. For example, both of the optical communication devices are battery-driven ones. The optical communication between the optical communication device of the first station and the optical communication device of the second station follows the baseband system.

Figure 26:
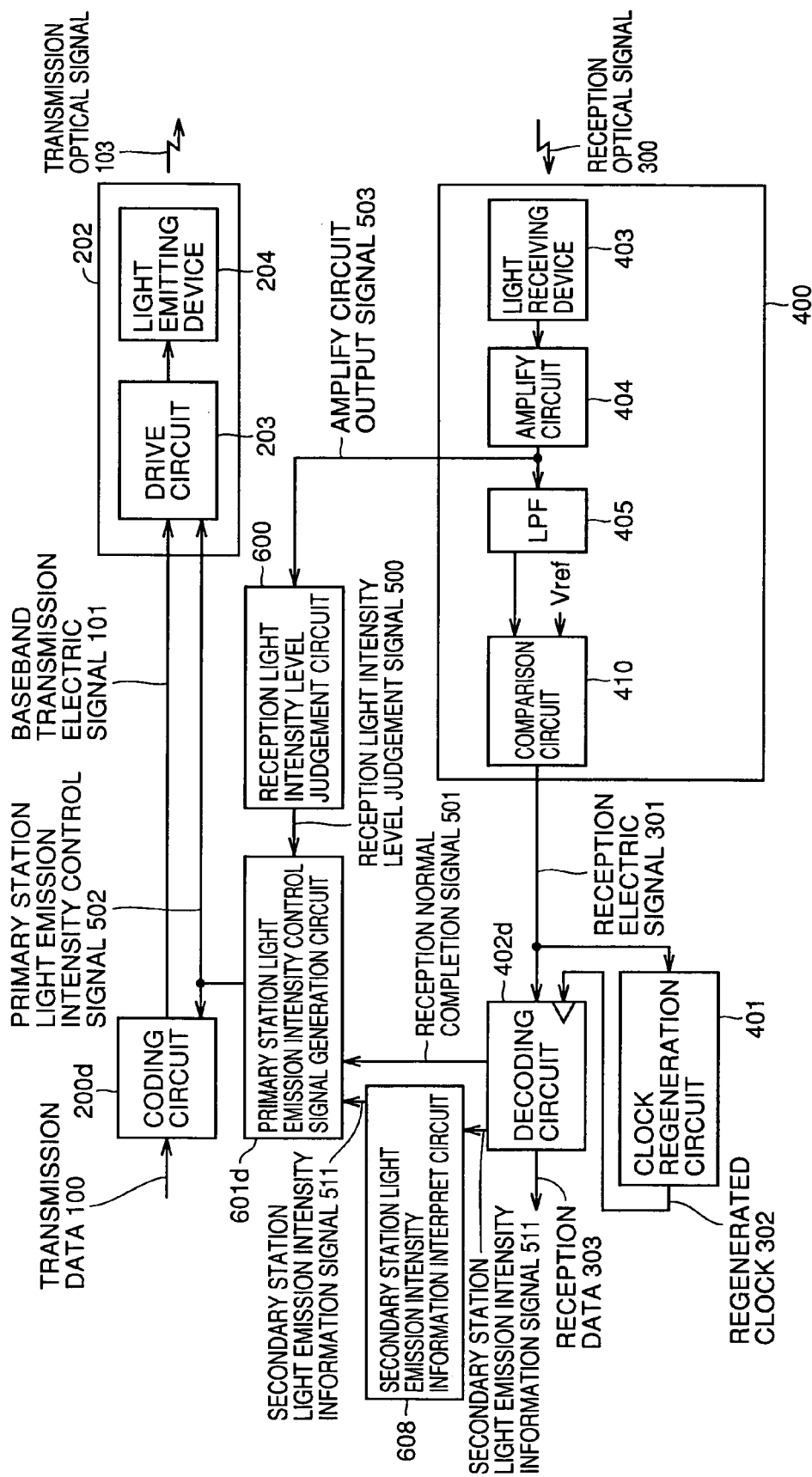
FIG. 26 is a schematic block diagram showing a structure of an optical communication device according to the fourth embodiment of the invention.

FIG. 26 is a schematic block diagram showing a structure of the optical communication devices of the first and second stations in this embodiment. The optical communication device includes a coding circuit 200d coding a transmission data 100 and a primary station light emission intensity control signal 502, an optical transmission circuit 202 converting a baseband transmission electric signal 101 supplied from coding circuit 200d to an optical signal (transmission optical signal 103) and outputting the converted one, an optical reception circuit 400 converting a reception optical signal 300 supplied from any external source to an electric signal (reception electric signal 301) and outputting the converted one, a clock regeneration circuit 401 extracting a clock signal from reception electric signal 301 supplied from optical reception circuit 400 and outputting the clock signal, a decoding circuit 402d decoding reception data and secondary station light emission intensity information based on reception electric signal 301 supplied from optical reception circuit 400 and the clock signal supplied from clock regeneration circuit 401, and outputting a reception normal completion signal 501 showing that data reception is normally completed, a reception light intensity level judgement circuit 600 inputting an amplify circuit output signal 503 supplied from optical reception circuit 400 to judge the intensity level of received light, a primary station light emission intensity control signal generation circuit 601 instructing optical transmission circuit 202 about the light emission intensity based on reception normal completion signal 501 supplied from decoding circuit 402d and reception light intensity level judgement signal 500, a secondary station light emission intensity information interpret circuit 608 inputting secondary station light emission intensity information signal 511 extracted by decoding circuit 402d and interpreting the secondary station light emission intensity information, and a primary station light emission intensity control signal generation circuit 601d controlling the light emission intensity of the primary station based on reception light intensity level judgement signal 500 supplied from reception light intensity level judgement circuit 600, on reception normal completion signal 501 supplied from decoding circuit 402d, and on secondary station light emission intensity information interpret signal 511 supplied from secondary station light emission intensity information interpret circuit 608.

Primary station light emission intensity control signal generation circuit 601d regards reception light intensity level judgement signal 500 as valid when reception normal completion signal 501 supplied from decoding circuit 402d is active, compares reception light emission intensity level judgement signal 500 with secondary station light intensity information interpret signal 511, determines the light emission intensity of the primary station, and outputs primary station light emission intensity control signal 502. Coding circuit 200 adds primary station light emission intensity control signal 502 to transmission data 100 for coding. Drive circuit 203 controls the light emission intensity of light emitting device 204 based on primary station light emission intensity control signal 502.

The optical communication is generally the half duplex communication, and thus data transmission is carried out after data reception is completed. During the period in which the optical communication device transmits data, an optical signal is not received from the optical communication device of the secondary station, and thus amplify circuit output signal 503 supplied to reception light intensity level judgement circuit 600 has no amplitude or a small amplitude due to noises such as background light. It is thus considered that reception light intensity level judgement signal 500 at the time of input of reception normal completion signal 501 to primary station light emission intensity control signal generation circuit 601 does not properly reflect the intensity of the optical signal received from the optical communication device of the secondary station. In view of this, after reception optical signal 300 is supplied from the optical communication device of the secondary station and till primary station light emission intensity control signal generation circuit 601d outputs primary station light emission intensity control signal 502, reception light intensity level judgement circuit 600 should hold reception light intensity level judgement signal 500.

Although description of the timing at which the light emission intensity of the primary station is adjusted is not given here, the adjustment may be made only at the start of communication, the adjustment may be made each time the transmission is performed, or the adjustment may be made periodically in the communication.

As heretofore described, in the optical communication device of this embodiment, the secondary station light emission intensity information is compared with the reception light intensity level for controlling the light emission intensity of the primary station, so that adjustment of the light emission intensity of the primary station can further appropriately be made.

Fifth Embodiment

The optical communication devices in the first to the fourth embodiments are applied to the infrared ray space transmission. An optical communication device of the fifth embodiment is applied to a bidirectional communication using the optical fiber. The internal structure and the function of the optical communication device are identical to those of the optical communication devices in the first to the fourth embodiments, and detailed description thereof is not repeated here.

Figure 27:
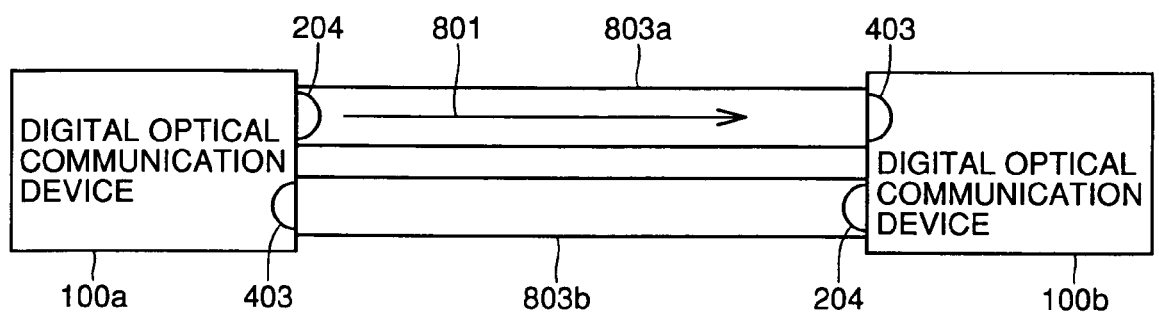
FIG. 27 shows an example of an external view of an optical communication device according to the fifth embodiment of the invention.
Figure 28:
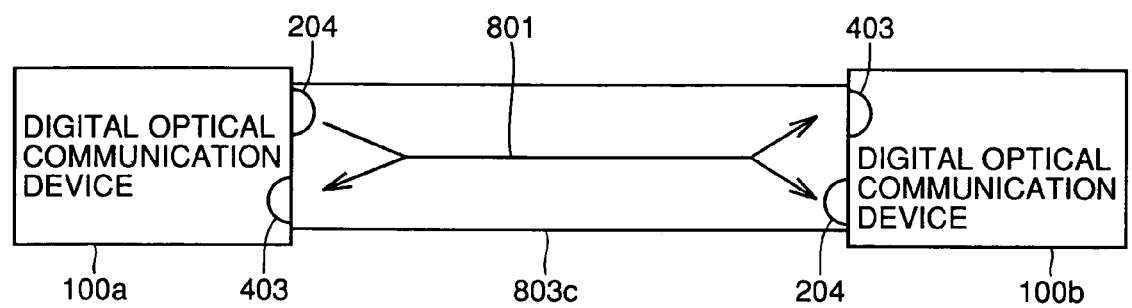
FIG. 28 shows another example of the external view of the optical communication device in the fifth embodiment of the invention.

FIG. 27 shows one example of an outlook of the optical communication device in this embodiment. As shown in FIG. 27, digital optical communication devices 100 corresponding to each other are provided, a light emitting device 204 of the optical communication device 100a of the first station is connected with a light receiving device 403 of the optical communication device 100b of the second station by an optical fiber 803a. A light receiving device 403 of optical communication device 100a of the first station is connected with a light emitting device 204 of optical communication device 100b of the second station by an optical fiber 803b. Those components may be connected by a single optical fiber 803c as illustrated in FIG. 28.

Figure 29:
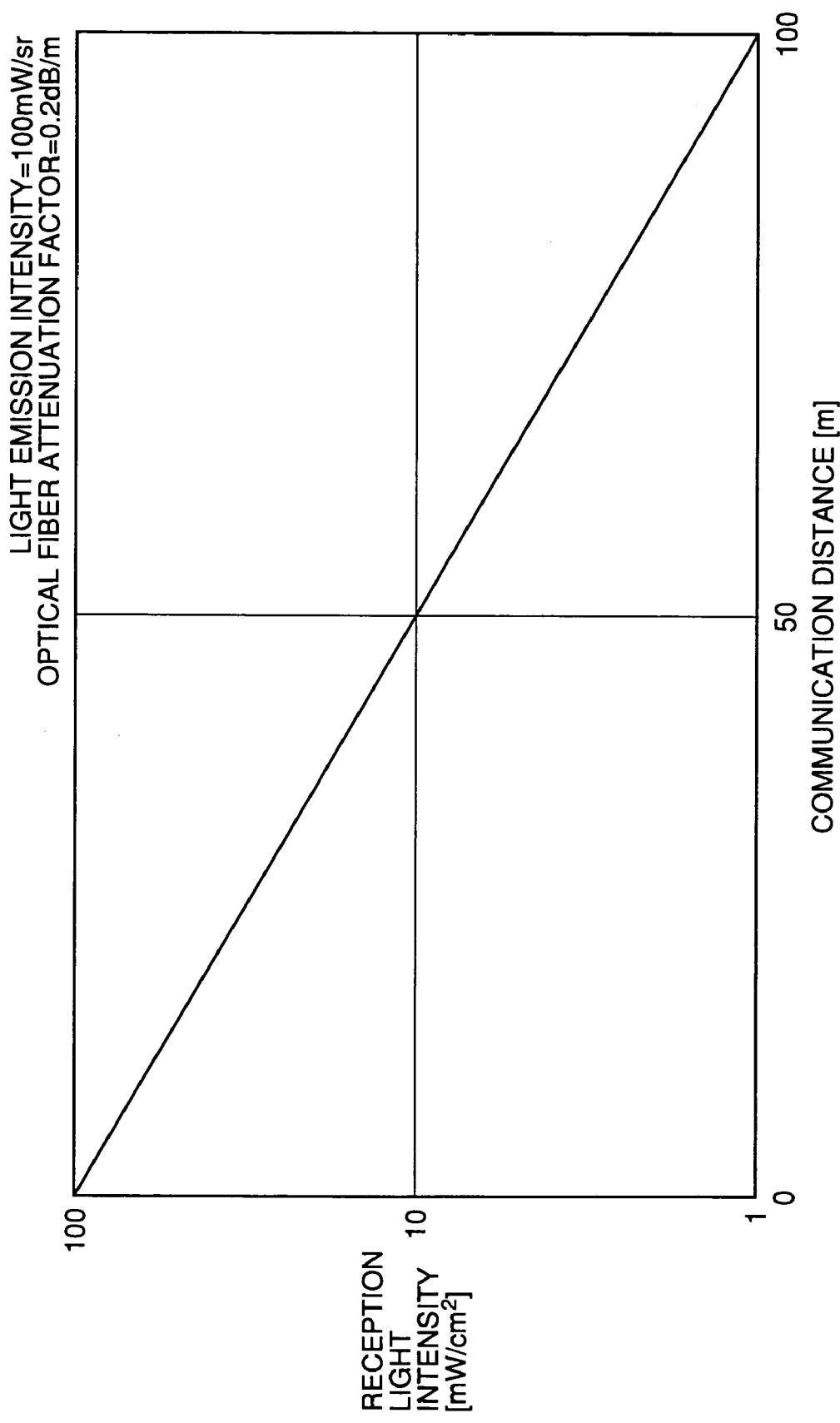
FIG. 29 shows a relation between a communication distance and a reception light intensity of the optical communication device according to the fifth embodiment of the invention.
Figure 30:
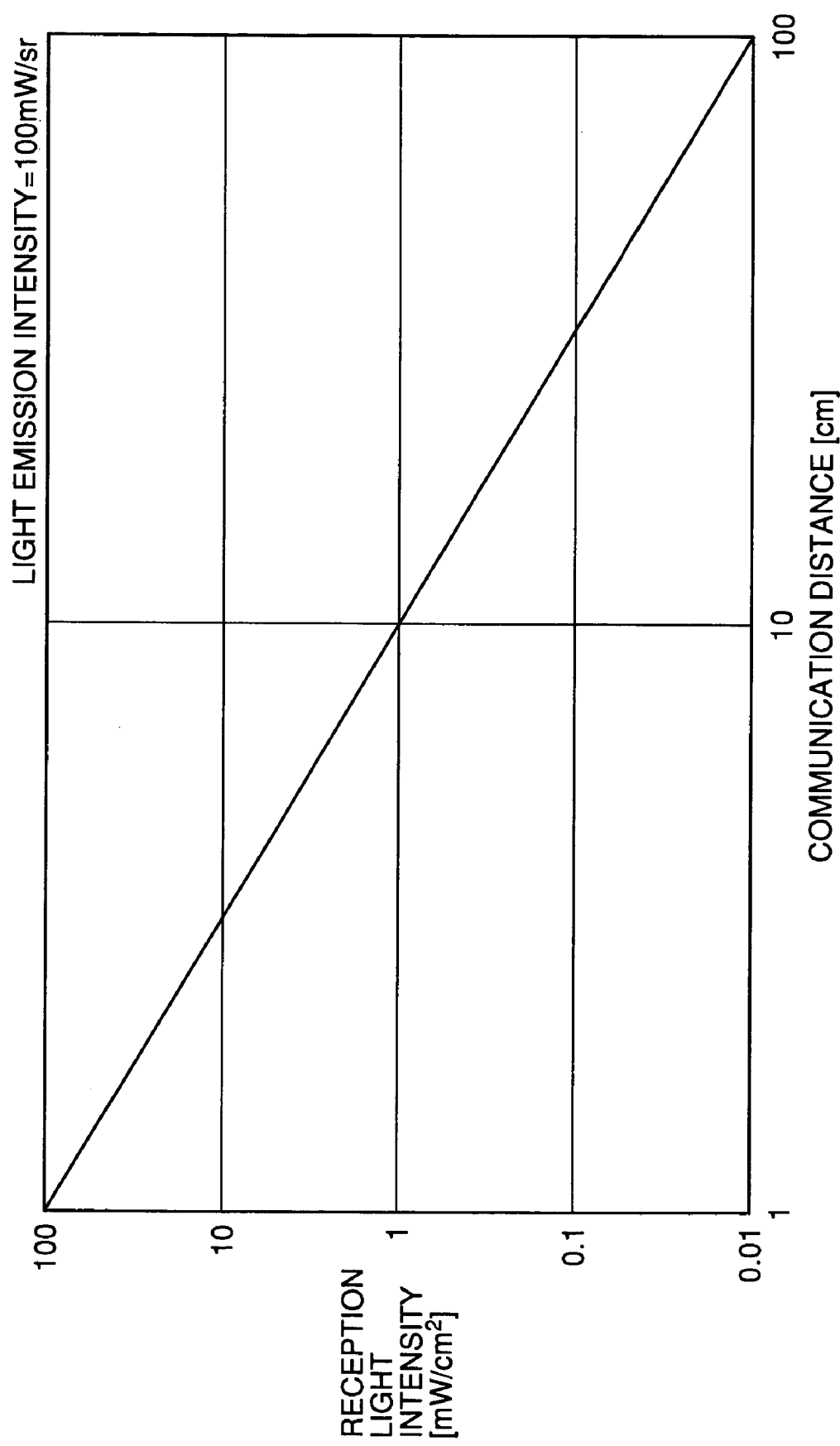
FIG. 30 is a log—log graph illustrating the graph of FIG. 11.

FIG. 29 shows the relation between the communication distance between optical communication devices and the intensity of received light in this embodiment. Since the optical fiber has a constant attenuation factor, the relation between the communication distance and the reception light intensity when the light emission intensity is constant is a linear relation as shown in FIG. 29. The graph shown in FIG. 29 is a semi-logarithmic graph indicating the axis of ordinates as logarithm. On the other hand, the relation between the communication distance and the reception light intensity in the infrared ray space transmission is the one as shown in FIG. 11. The graph is represented by the straight line as shown in FIG. 30 in the log—log graph.

The transmission employing the optical fiber is advantageous over the infrared ray space transmission in that the former can utilize a longer communication distance. Further, by appropriately setting the values of reference voltages ref1, ref2 and ref3 in reception light intensity level judgment circuit 600 in FIG. 10, the optical communication device of this embodiment can be structured. The optical fiber transmission is hardly influenced by noises due to sunlight or light from fluorescent lamp, therefore, the optical communication is often carried out with the baseband signal as it is. Consequently, any circuit such as modulation circuit 201 can be omitted.

As heretofore described, in the optical communication device of this embodiment, data communication is made by employing the optical fiber transmission, so that there is no noise from sunlight or light from fluorescent lamp and the light emission intensity can further easily be adjusted compared with the infrared ray space transmission. Further, the device can be implemented using the baseband transmission and the circuit structure can thus be simplified.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A digital optical communication device comprising:
an optical reception circuit converting an optical signal received from any external source to an electric signal;
a decoding circuit decoding the electric signal resultant from conversion by said optical reception circuit and judging whether or not the decoding is normally completed;
a reception light intensity level judgement circuit judging an intensity level of received light based on the electric signal resultant from conversion by said optical reception circuit;
a coding circuit coding transmission data;
an optical transmission circuit being configured to determine a light emission intensity based on result of the judgement by said reception light intensity level judgement circuit and result of the judgement by said decoding circuit and to convert the transmission data coded by said coding circuit to an optical signal with the light emission intensity;
wherein said optical transmission circuit determines the light emission intensity from a plurality of different light emission intensity values by referring to the intensity level judged by said reception light intensity level judgement circuit in the case where said decoding circuit judges that the decoding is normally completed, where said plurality of different light emission intensity values each correspond to a different range of reception light intensities; and
wherein said optical transmission circuit determines the light emission intensity without referring to the intensity level judged by said reception light intensity level judgement circuit in the case where if said decoding circuit judges that the decoding is not normally completed.

2. A digital optical communication device comprising:
an optical reception circuit converting an optical signal received from any external source to an electric signal;
a decoding circuit decoding the electric signal resultant from conversion by said optical reception circuit and judging whether or not the decoding is normally completed;
a reception light intensity level judgement circuit judging an intensity level of received light based on the electric signal resultant from conversion by said optical reception circuit;
a coding circuit coding transmission data;
an optical transmission circuit being configured to determine a light emission intensity based on result of the judgement by said reception light intensity level judgement circuit and result of the judgement by said decoding circuit and to convert the transmission data coded by said coding circuit to an optical signal with the light emission intensity;
wherein said optical transmission circuit determines the light emission intensity from a plurality of different light emission intensity values, where the plurality of different light emission intensity values each correspond to a different range of reception light intensities;
an optical fiber connected to said optical transmission circuit; and
an optical fiber connected to said optical reception circuit.

3. A digital optical communication device comprising:
an optical reception circuit converting an optical signal received from any external source to an electric signal;
a decoding circuit decoding the electric signal resultant from conversion by said optical reception circuit, judging whether or not the decoding is normally completed, and extracting reception light intensity information of a secondary station;
a coding circuit coding transmission data;
an optical transmission circuit being configured determine a light emission intensity based on the reception light intensity information of the secondary station extracted by said decoding circuit, and to convert the transmission data coded by said coding circuit to an optical signal with the light emission intensity;
wherein said optical transmission circuit determines the light emission intensity from a plurality of different light emission intensity values, where the plurality of different light emission intensity values each correspond to a different range of reception light intensities;
an optical fiber connected to said optical transmission circuit; and
an optical fiber connected to said optical reception circuit.

4. A digital optical communication device comprising:
an optical reception circuit converting an optical signal received from any external source to an electric signal;
a decoding circuit decoding the electric signal resultant from conversion by said optical reception circuit and judging whether or not the decoding is normally completed;
a reception light intensity level judgement circuit judging an intensity level of received light from a primary station based on the electric signal resultant from conversion by said optical reception circuit;
a coding circuit generating reception light intensity information of the primary station based on result of the judgement by said decoding circuit and result of the judgement by said reception light intensity level judgement circuit and coding transmission data and said reception light intensity information, wherein the reception light intensity information being generated is one of a plurality of different light emission intensity values where the plurality of different light emission intensity values each correspond to a different range of light intensities for the primary station;
an optical transmission circuit converting the reception light intensity information and the transmission data coded by said coding circuit to an optical signal;
wherein said coding circuit encodes said transmission data, said reception light intensity information, and reception normal completion information judged by said decoding circuit, and
wherein said optical transmission circuit converts the transmission data, the reception light intensity information, and the reception normal completion information coded by said coding circuit to the optical signal.

5. A digital optical communication device comprising:
an optical reception circuit converting an optical signal received from any external source to an electric signal;
a decoding circuit decoding the electric signal resultant from conversion by said optical reception circuit and judging whether or not the decoding is normally completed;
a reception light intensity level judgement circuit judging an intensity level of received light from a primary station based on the electric signal resultant from conversion by said optical reception circuit;
a coding circuit generating reception light intensity information of the primary station based on result of the judgement by said decoding circuit and result of the judgement by said reception light intensity level judgement circuit and coding transmission data and said reception light intensity information, wherein the reception light intensity information being generated is one of a plurality of different light emission intensity values where the plurality of different light emission intensity values each correspond to a different range of light intensities for the primary station; requested to the secondary station generated by said secondary station request light emission intensity control signal generation circuit; and an optical transmission circuit converting the transmission data and the light emission intensity information requested to the secondary station that are coded by said coding circuit with the light emission intensity requested from the secondary station that is extracted by said decoding circuit.

6. A digital optical communication device comprising:

an optical reception circuit being configured to convert an optical signal received from any external source to an electric signal;

a decoding circuit configured to decode the electric signal converted by said optical reception circuit, to extract a light emission intensity requested from a secondary station, and to judge whether or not the decoding is normally completed;

a reception light intensity level judgment circuit being configured to judge an intensity level of received light based on the electric signal converted by said optical reception circuit; a secondary station light emission intensity control signal generation circuit that generates light emission intensity information requested to the secondary station based on result of the judgment by said decoding circuit and on the reception light intensity level judged by said reception light intensity level judgment circuit, wherein the reception light intensity information being generated is one of a plurality of different light emission intensity values where the plurality of different light emission intensity values each correspond to a different range of light levels of light of the secondary station;

a coding circuit coding that codes data and the light emission intensity information to be transmitted by the secondary station generated by said secondary station light emission intensity control signal generation circuit; and an optical transmission circuit that converts the data and the light emission intensity information coded by said coding circuit with the light emission intensity that is extracted by said decoding circuit.

7. The digital optical communication device according to claim 6, wherein said reception light intensity level judgment circuit judges the reception light intensity level based on the electric signal converted by said optical reception circuit from the time at which said decoding circuit detects a start flag to the time at which said decoding circuit detects a stop flag.

8. The digital optical communication device according to claim 6, further comprising:

an optical fiber connected to said optical transmission circuit; and an optical fiber connected to said optical reception circuit.

9. A digital optical communication device comprising:

an optical reception circuit being configured to convert an optical signal received from any external source to an electric signal;

a decoding circuit that decodes the electric signal converted by said optical reception circuit, that extracts a light emission intensity requested from a secondary station, and that judges whether or not the decoding is normally completed;

a reception light intensity level judgment circuit that judges a reception light intensity level based on the electric signal converted by said optical reception circuit;

a secondary station light emission intensity control signal generation circuit that generates light emission intensity information requested to the secondary station based the judgment by said decoding circuit and on the reception light intensity level judged by said reception light intensity level judgment circuit;

a coding circuit being configured to code data data and the light emission intensity information generated by said secondary station light emission intensity control signal generation circuit for transmission by the digital optical communication device; and an optical transmission circuit being configured to convert the data and the light emission intensity information coded by said coding circuit with the light emission intensity extracted by said decoding circuit;

wherein said reception light intensity level judgment circuit judges the reception light intensity level by measuring a pulse width of the electric signal converted by said optical reception circuit.

10. A digital optical communication device comprising:

an optical reception circuit converting an optical signal received from any external source to an electric signal;

a decoding circuit decoding the electric signal resultant from conversion by said optical reception circuit, extracting a secondary station light emission intensity information, and judging whether or not the decoding is normally completed;

a reception light intensity level judgement circuit judging a reception light intensity level based on the electric signal resultant from conversion by said optical reception circuit, a primary station light emission intensity control signal generation circuit determining a light emission intensity of a primary station based on the secondary station light emission intensity information extracted by said decoding circuit, on result of the judgement by said decoding circuit, and on result of the judgement by said reception light intensity level judgement circuit;

wherein said primary station light emission intensity control signal generation circuit determines the light emission intensity from a plurality of different light emission intensity values, where the plurality of different light emission intensity values each correspond to a different range of reception light intensities;

a coding circuit coding transmission data and information on the light emission intensity of the primary station determined by said primary station light emission intensity control signal generation circuit; and an optical transmission circuit converting the transmission data and the light emission intensity information coded by said coding circuit to an optical signal with the light emission intensity determined by said primary station light emission intensity control signal generation circuit.

11. The digital optical communication device according to claim 10, further comprising:

an optical fiber connected to said optical transmission circuit; and an optical fiber connected to said optical reception circuit.

12. A digital optical communication method comprising the steps of:
- converting an optical signal received from any external source to an electric signal;
- decoding said converted electric signal;
- extracting a light emission intensity requested from a secondary station, judging whether or not the decoding is normally completed;
- wherein the extracted light emission intensity requested from a secondary station corresponds to one of a plurality of different light emission intensity values, where the plurality of different light emission intensity values each correspond to a different range of light intensity levels or light at the secondary station;
- judging a reception light intensity level based on the converted electric signal;
- generating light emission intensity information based on result of said judgment as to whether or not the decoding is normally completed and on said judged reception light intensity level;
- coding data to be transmitted and said generated light emission intensity information; and
- converting said coded data and said coded light emission intensity information to an optical signal with said extracted light emission intensity.

13. A digital optical communication device comprising:
- an optical reception circuit converting an optical signal received from any external source to an electric signal;
- a decoding circuit decoding the electric signal resultant from conversion by said optical reception circuit and judging whether or not the decoding is normally completed;
- a reception light intensity level judgement circuit judging an intensity level of received light based on the electric signal resultant from conversion by said optical reception circuit, wherein circuitry of the reception light intensity level judgment circuit for judging an intensity level of received light is configured so as to output one intensity level judgment signal of a plurality of different intensity level judgment signals, said one intensity level judgment signal being representative of one determined light emission intensity;
- a coding circuit coding transmission data;
- an optical transmission circuit determining a light emission intensity based on result of the judgement by said reception light intensity level judgement circuit and result of the judgement by said decoding circuit and converting the transmission data coded by said coding circuit to an optical signal with the determined light emission intensity; and
- wherein circuitry of the optical transmission circuit for converting the transmission data to an optical signal having the light emission intensity is configured so as to be capable of outputting optical signals having any one of a plurality of light emission intensities and wherein a specific one of the plurality of light emissions intensities is selected as said determined light emission intensity responsive to said one intensity level judgment signal.

14. The digital optical communication device according to claim 13, wherein
said reception light intensity level judgement circuit compares the electric signal resultant from conversion by said optical reception circuit with a plurality of reference voltages, and judges said intensity level of the received light based on result of the comparison.

15. A digital optical communication device comprising:
- an optical reception circuit converting an optical signal received from any external source to an electric signal;
- a decoding circuit decoding the electric signal resultant from conversion by said optical reception circuit, judging whether or not the decoding is normally completed, and extracting reception light intensity information of a secondary station;
- a coding circuit coding transmission data;
- an optical transmission circuit determining a light emission intensity based on the reception light intensity information of the secondary station extracted by said decoding circuit, and converting the transmission data coded by said coding circuit to an optical signal with the determined light emission intensity; and
- wherein the determined the light emission intensity is selected from a plurality of different light emission intensity values, where the plurality of different light emission intensity values each correspond to a different range of reception light intensities at the secondary station.

16. The digital optical communication device according to claim 15, wherein
- said decoding circuit decodes the electric signal resultant from conversion by said optical reception circuit and extracts the reception light intensity information and reception normal completion information of the secondary station, and
- said optical transmission circuit determines the light emission intensity based on the reception light intensity information and the reception normal completion information of the secondary station that are extracted by said decoding circuit, and converts the transmission data coded by said coding circuit to the optical signal with the light emission intensity.

17. A digital optical communication device comprising:
- an optical reception circuit converting an optical signal received from any external source to an electric signal;
- a decoding circuit decoding the electric signal resultant from conversion by said optical reception circuit and judging whether or not the decoding is normally completed;
- a reception light intensity level judgement circuit judging an intensity level of received light based on the electric signal resultant from conversion by said optical reception circuit;
- a coding circuit generating reception light intensity information of a primary station based on result of the judgement by said decoding circuit and result of the judgement by said reception light intensity level judgement circuit and coding transmission data and said reception light intensity information, wherein the reception light intensity information being generated is one of a plurality of different light emission intensity values where the plurality of different light emission intensity values each correspond to a different range of light intensities for the primary station; and
- an optical transmission circuit converting the reception light intensity information and the transmission data coded by said coding circuit to an optical signal.

18. A digital optical communication method comprising the steps of:
- converting an optical signal received from any external source to an electric signal;
- decoding said electric signal resultant from conversion and judging whether or not the decoding is normally completed;

judging an intensity level of received light based on said electric signal resultant from conversion and providing a specific one of a plurality of different intensity judgment signals, said specific one judgment signal being representative of one determined light emission intensity;

coding transmission data; and determining a light emission intensity based on said judged intensity level of the received light and on result of said judgement as to whether or not the decoding is normally completed, and converting said coded transmission data to an optical signal with the determined light emission intensity, wherein said converting includes selecting a specific one of a plurality of different light emission intensities based on said specific one intensity level judgment signal.

19. A digital optical communication method comprising the steps of:

converting an optical signal received from any external source to an electric signal;

decoding said electric signal resultant from conversion, judging whether or not the decoding is normally completed, and extracting reception light intensity information of a secondary station;

coding transmission data;

determining a light emission intensity based on said extracted reception light intensity information of the secondary station, and converting said coded transmission data to an optical signal with the light emission intensity; and wherein the determined the light emission intensity is selected from a plurality of different light emission intensity values, where the plurality of different light emission intensity values each correspond to a different range of reception light intensities of the secondary station.

20. A digital optical communication method comprising the steps of:

converting an optical signal received from any external source to an electric signal;

decoding said electric signal resultant from conversion and judging whether or not the decoding is normally completed;

judging an intensity level of received light based on said electric signal resultant from conversion;

generating reception light intensity information of a primary station based on said judged intensity level of the received light and on result of said judgement as to whether or not the decoding is normally completed, and coding transmission data and said reception light intensity information, wherein the reception light intensity information being generated is one of a plurality of different light emission intensity values where the plurality of different light emission intensity values each correspond to a different range of light intensities of the secondary station; and converting said coded reception light intensity information and said coded transmission data to an optical signal.

21. A digital optical communication method comprising the steps of:

converting an optical signal received from any external source to an electric signal;

decoding said electric signal, extracting a secondary station light emission intensity of optical signals from a primary station, and judging whether or not the decoding is normally completed:

judging a reception light intensity level of optical signals from the secondary station based on said electric signal;

determining a light emission intensity of a primary station based on said extracted secondary station light emission intensity of the primary station optical signals, based on said judgment as to whether or not the decoding is normally completed, and based on said judged reception light intensity level for secondary station optical signals;

coding data to be transmitted and in formation on said determined light emission intensity of the primary station; and converting said coded data and said coded light emission intensity information to an optical signal with said determined light emission intensity.

22. The digital optical communication method of claim 21, wherein said determining includes comparing the extracted secondary station light intensity with the judged reception light intensity level.

23. The digital optical communication method of claim 21, wherein the determined the light emission intensity is selected from a plurality of different light emission intensity values.

* * * * *